US011330680B2

(12) United States Patent
Chaimov et al.

(10) Patent No.: US 11,330,680 B2
(45) Date of Patent: May 10, 2022

(54) CALIBRATION OF AN RF PROCESSING SYSTEM

(71) Applicant: GOJI LIMITED, Hamilton (BM)

(72) Inventors: Itzhak Chaimov, Mazkeret-Batya (IL); Avner Libman, Holon (IL)

(73) Assignee: GOJI LIMITED, Hamilton (IL)

( * ) Notice: Subject to any disclaimer, the term of this patent is extended or adjusted under 35 U.S.C. 154(b) by 517 days.

(21) Appl. No.: 16/549,454

(22) Filed: Aug. 23, 2019

(65) Prior Publication Data

US 2019/0380177 A1 Dec. 12, 2019

Related U.S. Application Data

(63) Continuation of application No. 14/892,744, filed as application No. PCT/IL2014/050447 on May 21, 2014, now Pat. No. 10,433,376.

(Continued)

(51) Int. Cl.
*H05B 6/68* (2006.01)
*H05B 6/64* (2006.01)
(Continued)

(52) U.S. Cl.
CPC ............ *H05B 6/68* (2013.01); *H05B 6/6447* (2013.01); *H05B 6/6452* (2013.01);
(Continued)

(58) Field of Classification Search
CPC .. H05B 6/6447; H05B 6/6452; H05B 6/6455; H05B 6/6458; H05B 6/664; H05B 6/68;
(Continued)

(56) References Cited

U.S. PATENT DOCUMENTS

| 5,945,018 A | 8/1999 | Halen |
| 6,080,270 A | 6/2000 | Tabrez |

(Continued)

FOREIGN PATENT DOCUMENTS

| CN | 1279376 | 1/2001 |
| EP | 0 043 958 | 1/1982 |

(Continued)

OTHER PUBLICATIONS

Opposition document dated Jul. 31, 2019 in EP application No. 14 733 733.1.

(Continued)

*Primary Examiner* — Quang T Van
(74) *Attorney, Agent, or Firm* — Greenblum & Bernstein, P.L.C.

(57) ABSTRACT

Method of processing an object in an energy application zone by radio frequency (RF) radiation emitted by one or more radiating elements configured to emit the RF radiation in response to RF energy applied thereto, wherein the method includes controlling supply of RF energy to the one or more radiating elements via an RF energy supply component, receiving measured response values produced based on RF energy received by the one or more radiating elements from the energy application zone, accessing a stored set of coefficients associated with the RF energy supply component, said set of coefficients being utilized to transform the measured response values and controlling application of RF energy to the one or more radiating elements based on the measured response values and the set of coefficients.

22 Claims, 11 Drawing Sheets

Related U.S. Application Data

(60) Provisional application No. 61/825,760, filed on May 21, 2013.

(51) Int. Cl.
   *H05B 6/70* (2006.01)
   *H05B 6/72* (2006.01)
   *H05B 6/66* (2006.01)

(52) U.S. Cl.
   CPC ......... *H05B 6/6455* (2013.01); *H05B 6/6458* (2013.01); *H05B 6/664* (2013.01); *H05B 6/686* (2013.01); *H05B 6/705* (2013.01); *H05B 6/72* (2013.01); *Y02B 40/00* (2013.01)

(58) Field of Classification Search
   CPC .......... H05B 6/686; H05B 6/705; H05B 6/72; Y02B 40/00
   USPC ....... 219/702, 704, 709, 748, 438, 490, 660, 219/690, 694, 695, 696, 697; 426/87; 156/345; 324/637
   See application file for complete search history.

(56) References Cited

U.S. PATENT DOCUMENTS

| | | | |
|---|---|---|---|
| 6,249,710 | B1 | 6/2001 | Drucker |
| 6,813,534 | B2 * | 11/2004 | Sui .................... H01J 37/32935 216/60 |
| 8,839,527 | B2 | 9/2014 | Ben-Shmuel et al. |
| 9,040,879 | B2 | 5/2015 | Libman et al. |
| 9,161,390 | B2 | 10/2015 | Gelbart et al. |
| 10,433,376 | B2 | 10/2019 | Chaimov |
| 2011/0031237 | A1 | 2/2011 | Bilchinsky |
| 2012/0312801 | A1 | 12/2012 | Bilchinsky et al. |
| 2013/0048880 | A1 | 2/2013 | Einziger et al. |
| 2013/0048881 | A1 | 2/2013 | Einziger et al. |
| 2013/0062334 | A1 | 3/2013 | Bilchinsky et al. |
| 2013/0080098 | A1 | 3/2013 | Hadad et al. |
| 2013/0087545 | A1 | 4/2013 | Bilchinsky et al. |
| 2013/0146590 | A1 | 6/2013 | Einziger et al. |
| 2013/0240757 | A1 | 9/2013 | Einziger et al. |
| 2014/0247060 | A1 | 9/2014 | Ben Haim et al. |
| 2014/0287100 | A1 | 9/2014 | Libman |
| 2015/0070029 | A1 | 3/2015 | Libman et al. |
| 2015/0156827 | A1 | 6/2015 | Ibragimov et al. |
| 2016/0095171 | A1 | 3/2016 | Chaimov |

FOREIGN PATENT DOCUMENTS

| | | |
|---|---|---|
| EP | 2 255 596 | 12/2000 |
| EP | 3 000 283 | 1/2018 |
| JP | 2001-015262 | 1/2001 |
| JP | 2001-056126 | 2/2001 |
| JP | 3725738 | 2/2001 |
| JP | 2003-086347 | 3/2003 |
| JP | 4417595 | 3/2003 |
| JP | 2005-114227 | 4/2005 |
| JP | 4325349 | 4/2005 |
| JP | 2009-272273 | 11/2009 |
| WO | 97/00596 | 1/1997 |
| WO | 99/66767 | 12/1999 |
| WO | 2011/058537 | 5/2011 |
| WO | 2013/138675 | 11/2011 |
| WO | 2013/021285 | 2/2013 |
| WO | 2013/033330 | 3/2013 |
| WO | 2014/188422 | 11/2014 |

OTHER PUBLICATIONS

Summons for oral proceeding dated Sep. 27, 2019 in EP application No. 14 733 733.1.

* cited by examiner

CALIBRATION OF AN RF PROCESSING SYSTEM

CROSS-REFERENCE TO RELATED APPLICATIONS

This application is a continuation of U.S. patent application Ser. No. 14/892,744 filed on Nov. 20, 2015 which application is a National Phase of PCT Patent Application No. PCT/IL2014/050447, filed May 21, 2014, and claims the benefit of U.S. Provisional Patent Application No. 61/825,760, filed on May 21, 2013, the disclosures of each of which are incorporated by reference herein in their entireties.

TECHNICAL FIELD

This is a patent application relating to an apparatus and method for applying electromagnetic energy and more particularly but not exclusively for calibration of an RF processing apparatus.

BACKGROUND

Electromagnetic waves have been used in various applications to supply energy to objects. In the case of radio frequency (RF) radiation for example, RF energy may be supplied using a magnetron, which is typically tuned to a single frequency for supplying RF energy only in that frequency. One example of a commonly used device for supplying RF energy is a microwave oven. Typical microwave ovens supply RF energy at or about a single frequency of 2.45 GHz.

SUMMARY

Some embodiments of the invention include an apparatus for processing an object in a cavity by radio frequency (RF) radiation emitted by one or more radiating elements configured to emit the RF radiation In response to RF energy applied thereto.

In some embodiments, the apparatus may comprise: an RF energy supply component configured to supply RF energy for application to one or more radiating elements; a memory storing a set of coefficients associated with the RF energy supply component; and a processor configured to receive feedback in response to emission of RF radiation by one or more of the radiating elements and control application of RF energy to one or more of the radiating elements based on the feedback and the set of coefficients.

In some embodiments, the set of coefficients associated with the RF energy supply component includes values of network parameters of the RF energy supply component.

Alternatively or additionally, the set of coefficients associated with the RF energy supply component includes error correction coefficients configured to correct systematic errors in the functioning of the RF energy supply component.

In some embodiments, one or more coefficients from the set of coefficients are indicative of an electrical response of the RF energy supply component to an electrical signal.

In some embodiments, the RF energy supply component includes a dual directional coupler having directivity below 30 dB.

In some embodiments, the processor may comprise: a first processing unit, configured to receive the feedback, and correct the received feedback based on the seat of coefficients; and a second processing unit, configured to control the application of the RF energy based on the corrected feedback.

In some embodiments, the processor may be configured to correct the received feedback based on the set of coefficients; and control the application of the RF energy based on the corrected feedback.

In some embodiments, the RF energy supply component includes an RF energy source.

Alternatively or additionally, the RF energy supply component includes an RF energy transmission line.

In some embodiments, the apparatus may include at least two RF energy supply components and wherein the memory is configured to store at least two sets of coefficients, each set of coefficients being associated with a respective RF energy supply component.

In some embodiments, the processor is configured to receive the feedback during a scanning stage and to control the application of the RF energy during a processing stage based on feedback received during the scanning stage.

In some embodiments, the processor is configured to receive the feedback during a scanning stage, within which RF radiation is emitted from the one or more radiating elements for determining one or more absorption characteristics of the object without substantially processing the object.

In some embodiments, the received feedback includes information for each of a plurality of frequencies of RF radiation emitted from the one or more radiating elements.

In some embodiments, the received feedback includes information associated with each of the one or more radiating elements.

In some embodiments, the received feedback includes one or more network parameter values depending on a response of the cavity to the emission of the RF radiation.

In some embodiments, the processor is configured to determine a corrected electrical characteristic of the object based on the received feedback and the set of coefficients stored in the memory.

In some embodiments, the set of coefficients comprises at least one coefficient per frequency of the emitted RF radiation.

In some embodiments, one or more coefficients of the set of coefficients are indicative of network parameter values of the RF energy supply component that can be determined using a network analyzer.

In some embodiments, the network parameter values are indicative of a ratio between a reflected signal voltage and an incident signal voltage in the RF energy supply component.

In some embodiments, the network parameter values are indicative of a ratio between a transmitted signal voltage and an incident signal voltage in the RF energy supply component.

In some embodiments, one or more coefficients of the set of coefficients have complex values.

In some embodiments, the processor is further configured to determine a set of update coefficients associated with a replacement component configured to replace the RF energy supply component; update the memory with the set of update coefficients; and control the application of RF energy based on the feedback and the set of update coefficients.

Thus, an aspect of some embodiments of the disclosure may include an RF energy supply component configured to supply RF energy for application to the one or more radiating elements; a memory storing a set of coefficients, the set being associated with the RF energy supply component; and a processor configured to: determine a set of update coefficients associated with a replacement RP energy supply component; update the memory with the set of update coefficients; receive feedback in response to emission of RF radiation by the one or more radiating elements; and control application of RF energy by the one or more radiating elements based on the feedback and the set of update coefficients. One or more coefficients of the set may be indicative of electrical response of the RF energy supply component to an electrical signal.

In some embodiments, updating the memory includes substituting a set of coefficients stored in the memory with the set of update coefficients.

In some embodiments, the replacement component includes an RF energy source. Alternatively or additionally, the replacement component includes an RF energy transmission line.

In some embodiments, in order to determine the set of update coefficients, the processor is configured to establish a baseline corrected electrical characteristics of an object based on a baseline feedback and the stored set of coefficients, observe new feedback after replacement of the RF energy supply component, establish a measured electrical characteristic of the object based on the new feedback, and calculate the set of update coefficients based on the measured electrical characteristics of the object, and the baseline corrected electrical characteristics of the object In some embodiments, the object is the cavity.

In some embodiments, the measured and corrected electrical characteristics of the object are the measured and corrected S parameters of the object.

In some embodiments, the RF energy supply component is a transmission line and the set of coefficients includes network parameters of the transmission line. Alternative or additionally, the energy supply component is a source of RF energy, and the set of coefficients includes error correction terms.

In some embodiments, the processor is associated with a device configured to automatically retrieve the set of update coefficients from at least one of a bar code, an RFID tag, and an electronic memory device associated with the replacement component.

In some embodiments, the processor is configured to retrieve the set of update coefficients based on an identifier associated with the replacement component. The identifier may be included in at least one of a bar code, an RFID tag, and an electrical memory device associated with the replacement component. In some embodiments, the identifier enables access to the set of update coefficients stored remotely with respect to the apparatus.

Some aspects of the disclosure may include a replacement component for an apparatus for processing an object in a cavity by radio frequency (RF) radiation emitted from one or more radiating elements configured to emit the RF radiation in response to RF energy applied thereto. The replacement component may include: a radio frequency (RF) energy supply component configured to supply RF energy for application to one or more of the radiating elements; and an identifier configured to enable a processor of the apparatus to determine a set of coefficients associated with the replacement component in order to update a memory of the apparatus, wherein one or more coefficients of the set of coefficients is indicative of an electrical response of the replacement component to an electrical signal.

In some embodiments, the replacement component includes an RF energy source, and/or an RF energy transmission line.

In some embodiments, the identifier includes a bar code, an RFID tag, or an identification number.

In some embodiments, one or more coefficients of the set of coefficients are indicative of network parameter values of the replacement component. The network parameter values may include values indicative of a ratio between a reflected signal voltage and an incident signal voltage in the replacement component. Alternatively or additionally, the network parameter values include values indicative of a ratio between a transmitted signal voltage and an incident signal voltage in the replacement component.

In some embodiments, one or more coefficients of the set of coefficients have complex values.

Some aspects of the disclosure may include an apparatus for processing an object in a cavity using radio frequency (RF) radiation. The apparatus may comprise: an RF energy source; a transmission line configured to supply RF energy from the RF energy source for application to a radiating element configured to emit RF radiation in response to RF energy applied thereto; a memory storing a set of coefficients indicative of network parameter values of the transmission line; and a processor. The processor may be configured to: retrieve a new set of coefficients upon replacement of the transmission line with a replacement transmission line and update the memory with the new set of coefficients; receive feedback in response to emission of the RF radiation by the radiating element; and control application of RF energy from the RF energy source based on the feedback and the new set of coefficients.

An aspect of some embodiments of the disclosure may include an oven including an apparatus as described above, for processing food using RF radiation.

In some embodiments, in order to determine the new set of coefficients, the processor is configured to establish baseline corrected electrical characteristics of an object based on a baseline feedback and the stored set of coefficients, observe new feedback after replacement of the RF energy supply component, establish a measured electrical characteristic of the object based on the new feedback, and calculate the new set of coefficients based on the measured electrical characteristics of the object, and the baseline corrected electrical characteristics of the object. In some embodiments, the object is the cavity.

In some embodiments, the measured and corrected electrical characteristics of the object are the measured and corrected S parameters of the object.

In some embodiments, the processor is associated with a device configured to retrieve the new set of coefficients from at least one of a bar code, an RFID tag, and a memory element associated with the replacement transmission line.

In some embodiments, in order to determine the new set of coefficients, the processor is configured to retrieve the new set of coefficients based on an identifier associated with the replacement transmission line.

In some embodiments, the identifier is included in at least one of a bar code, an RFID tag, and an electronic memory device associated with the replacement transmission line.

In some embodiments, the identifier enables access to the new set of coefficients stored remotely with respect to the apparatus.

According to some aspects of the disclosure, there is provided a method for replacing a radio frequency (RF) energy supply component in an apparatus for processing an object using RF radiation in a cavity, wherein the apparatus is configured to control application of the RF radiation to the cavity based on a set of coefficients associated with the RF energy supply component that are saved on a memory associated with the apparatus. The method may comprise: removing the RF energy supply component from the apparatus; replacing the removed RF energy supply component with a replacement RF energy supply component; causing determination of a set of coefficients associated with the replacement RF energy supply component; and causing update of the memory associated with the apparatus with the set of coefficients determined for the replacement RF energy supply component.

In some embodiments, one or more coefficients from the set of coefficients are indicative of an electrical response of the replacement RF energy supply component to an electrical signal.

In some embodiments, one or more coefficients from the set of coefficients are indicative of a network parameter of the replacement component.

In some embodiments, determination of the set of coefficients associated with the replacement RF energy supply component includes retrieving the set of coefficients from a memory located remotely with respect to the apparatus and/or from an electronic memory device associated with the replacement RF energy supply component.

In some embodiments, determination of the set of coefficients associated with the replacement RF energy supply component includes receiving data indicative of the set of coefficients from a user through a user interface.

In some embodiments, determination of the set of coefficients associated with the replacement RF energy supply component includes calculating the set of coefficients based on an observed difference between an operational characteristic of the apparatus before and after installation of the replacement RF energy supply component.

In some embodiments, the replacement RF energy supply component includes a source of RF energy.

In some embodiments, the replacement RF energy supply component includes an RF energy transmission line.

Some aspects of the disclosure may include an apparatus for processing an object in a cavity by RF radiation emitted by one or more radiating elements configured to emit the RF radiation in response to RF energy applied thereto through a transmission line. The apparatus may include a processor and an RF energy source, wherein the processor is configured to: receive information indicative of an electrical response of the transmission line to an electrical signal, and control the RF energy source based on the information.

In some embodiments, the processor is further configured to receive feedback indicative of an electrical response of the cavity to RF radiation emitted by the one or more radiating elements, and control the RF energy source based on the feedback and the information.

In some embodiments, the information includes values of network parameters of the transmission line.

Some embodiments, may include an oven including an apparatus as described above for processing food using RF radiation.

In some embodiments, the processor is configured to receive feedback during a scanning stage, during which RF radiation is emitted from the one or more radiating elements for determining one or more absorption characteristics without substantially processing the object; and control the RF energy source based on the feedback and the information during a processing stage, during which RF radiation for processing the object is emitted from the one or more radiating elements.

In some embodiments, the processor is configured to receive the information by retrieving the information from a non-volatile memory. The apparatus may include the non-volatile memory. Alternatively or additionally, the non-volatile memory may be remote from the apparatus.

In some embodiments, the processor is configured to receive the information from a device configured to retrieve the information from at least one of a bar code, an RFID tag, and an electronic memory device, and save the information on the non-volatile memory.

In some embodiments, the information indicative of an electrical response of the transmission line to an electrical signal comprises information received in response to emission of RF radiation by one or more of the radiating elements.

DETAILED DESCRIPTION

Figure 1A:
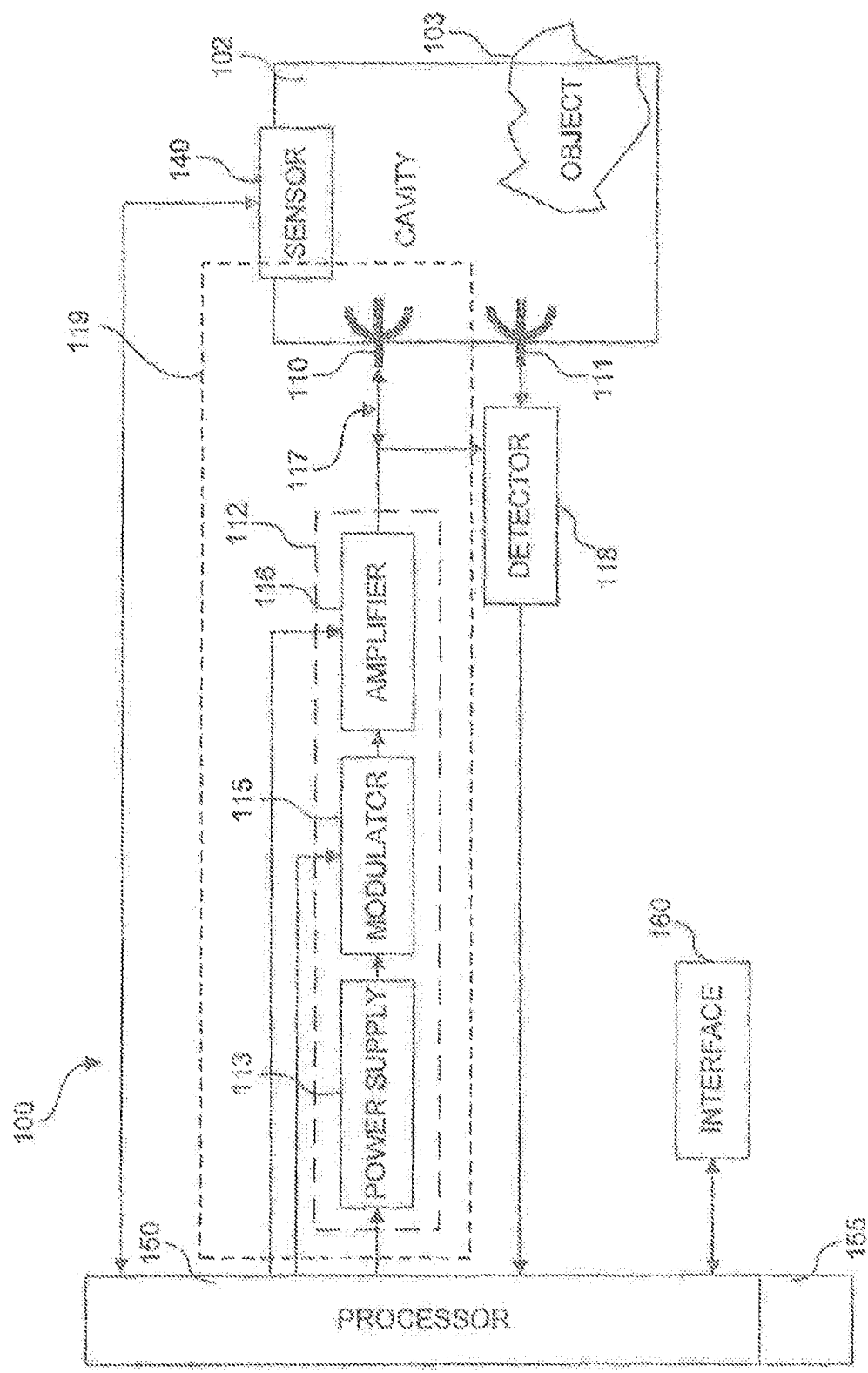
FIG. 1A is a diagrammatic representation of an exemplary apparatus according to some disclosed embodiments.

The following detailed description is provided by way of example and is not intended to limit the scope of the invention in any way. The described embodiments comprise different features, not all of which are required in all embodiments of the invention. The scope of the invention can be summarized by referring to the appended claims.

Some embodiments of the invention may be related to methods for replacing a radio frequency (RF) energy supply component in an apparatus for processing an object using RF radiation. The RF radiation may be emitted into a cavity enclosing the object. The apparatus may be configured to control application of the RF radiation to the cavity based on feedback indicative of electrical response of the cavity (with the object therein) to incoming electrical signals. Accordingly, some embodiments of the invention may relate to interpreting, modifying, and/or correcting values that depend on electrical response of a cavity to an incoming electrical signal. The incoming signal may be provided by the apparatus, e.g., by applying RF energy to radiating elements that emit to the cavity RF radiation in response to the applied RF energy. The electrical response of the cavity may be expressed in RF radiation emitted out of the cavity, and these may be received and measured. The RF radiation may be emitted out of the cavity, for example, through the radiating elements that emitted them to the cavity, through receiving elements configured to receive the outgoing radiation, and/or through seams in the cavity. Measurements of such emissions may be referred to herein as feedback measurements. The feedback measurement may also include measurements of the incoming signal, so ratios between incoming and outgoing signals may be measured. Since the cavity may encompass the object to be heated, the measured feedback may depend on characteristics of the object.

A parameter known in the art as S11 of the cavity may serve as an example to a characteristic of the object. This parameter may be indicative of the electrical response of the cavity to an electrical signal: it may denote what portion of the signal was reflected back to the emitting radiating element. The signal may be RF radiation emitted into the cavity through the emitting radiating element. However, a measured S11 parameter depends not only on the electrical response of the cavity (including any object inside the cavity) to the incoming electrical signal, but also to electrical characteristics of the measurement equipment, which may introduce in the measured feedback some systematic errors. Due to such systematic errors, the measured S11 parameter may differ from the true S11 parameter. Nevertheless, the measured S11 parameter still depends on the electrical response of the cavity to the incoming electrical signal, and may be used for calculating the true S11 parameter of the cavity. This true parameter may be associated with the object that was in the cavity when measurement was taken. Replacement of the measurement equipment or a part thereof may change the systematic errors of the measurement equipment, and therefore, measured values may also change, even though the true values may be unchanged. Accordingly, when measurement equipment or a part thereof is replaced, the calculation required for obtaining the true parameter based on measurement may also change. Some embodiments of the invention may relate to methods for changing the error corrections following replacement of a measurement equipment or a part thereof.

In some embodiments, correction of the systematic error of the measurement equipment may be done in a modular manner: correction coefficients may be calculated for each part on its own, and the error introduced by the equipment as a whole may be calculated based on correction coefficients of individual component. Accordingly, in some embodiments, when one component of a piece of measuring equipment is replaced, first the influence of the replaced component may be accounted for, and then, systematic errors of the rest of the measurement equipment may be taken into account.

For example, when applying a forward signal to the cavity, backward signals going out of the cavity in response to the forward signal may be measured. The feedback may include ratios between such forward and backward signals. One example of a characteristic of the object that may be determined this way is the ratio between voltages of a forward signal and a corresponding backward signal measured at the same radiating element, when the object is in the cavity. This ratio may be referred to as S11, and may serve to indicate a property of the object. Before using the value of the measured feedback, systematic errors of the measurement equipment may be taken into account to obtain corrected values. In order to account for systematic errors introduced by the measurement equipment, error correction coefficients may be used to correct measured values. The error correction coefficients may be indicative of differences between the measurement equipment used in practice, and a benchmark piece of measurement equipment. Measurement of a characteristic obtained with the benchmark equipment at a benchmark configuration may be referred to as "actual" characteristic. A value calculated based on measurement, and processed to be made more similar to the "actual" value may be referred to as "corrected". In some embodiments, the measurement equipment may include two (or more) parts, and the contribution of each part to the systematic error may be evaluated separately, and accumulated to obtain a correction accounting for the contribution of all parts of the measurement equipment to deviation from the "actual" values. For example, in some embodiments, the measured feedback may be received from a radiating element through a transmission line at a detector different from the benchmark detector. The detector may include a coupler (e.g., a dual directional coupler) having directivity lower than that of the benchmark detector. The benchmark conditions may include the benchmark detector connected to the radiating element, without the transmission line in between. Correction of the readings of the detector may include correcting the values of the measured feedback to resemble values that would have been detected if the detector was a benchmark detector and directly connected to the radiating element, with no transmission line in between. In order to accomplish such a correction, the measured values may first be corrected to account for systematic errors of the detector; and then, further corrected (or modified) to take into account the influence of the transmission line. This way, the corrected values of the feedback may be more similar to the 'actual' feedback. Alternatively, the measured value may first be corrected to the effect of the transmission line, and then corrected for systematic errors introduced by the detector. In some embodiments, the actual value may be obtained regardless the order of the corrections.

Reference will now be made in detail to various embodiments, examples of which are illustrated in the accompanying figures. Wherever possible, the same reference numbers will be used throughout the figures to refer to the same or like parts.

FIG. 1A is a diagrammatic representation of an exemplary apparatus according to some embodiments. Apparatus 100 may include a processor 150 associated with memory 155, for controlling the RF radiation applied to object 103 in cavity 102. Processor 150 may control the RF radiation applied to object 103 through a plurality of RF energy supply components that are connected directly or indirectly to radiating elements 110 and 11. Radiating elements 110 and 111 may be configured to emit RF radiation in response to RF energy applied to them. The RF energy supply component may include, for example, transmission line 117, detector 118, coupler 120 (FIG. 1B), and RF energy source 112, as well as any part of the RF energy source, for example, RF power supply 113, modulator 115, and amplifier 116.

Processor 150 may include any suitable logic or computational components configured according to the requirements of a particular application. In some embodiments, processor 150 may include any physical device having an electric circuit that performs a logic operation on input or inputs. For example, processor 150 may include one or more integrated circuits, microchips, microcontrollers, microprocessors, all or part of a central processing unit (CPU), graphics processing unit (GPU), digital signal processor (DSP), field-programmable gate array (FPGA) or other circuits suitable for executing instructions or performing logic operations. The instructions executed by the processor may, for example, be pre-loaded into a memory unit integrated with or embedded into the processor or may be stored in a separate memory unit. In case more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically or by other means permitting them to interact.

In some embodiments, processor 150 may be associated with a memory (e.g., memory 155). The term "memory" as used herein may include any physical device, internal or external to the processor, used to retain digital data. For example, a Random Access Memory (RAM), a Read-Only Memory (ROM), a hard disk, an optical disk, a magnetic medium, a flash memory, other permanent, fixed, volatile or non-volatile memory, or any other mechanism capable of storing information.

In some embodiments the RF radiation applied to object 103 may be emitted by radiating elements 110 and 111. The term "radiating element" as used herein may include any device configured to apply RF energy to an energy application zone (e.g., cavity 102). A radiating element may include any element, system or array of elements designed or configured to transmit or deliver RF energy. For example, the radiating element may include an antenna, an array of antennas, an RF feed, a waveguide, a slow wave antenna, a patch antenna, a monopole antenna, a dipole antenna, etc. In some embodiments, the location, orientation, and/or configuration of each radiating element may be determined before applying energy to the object. Alternatively or additionally, the location, orientation, and/or configuration of each radiating element may be dynamically adjusted, for example, by a controller (e.g., processor 150), during operation of the apparatus.

The terms "RF energy" and "RF radiation", as used herein and throughout the specification, may include any or all portions of the RF spectrum. RF energy may be any energy deliverable by electromagnetic radiation in the radio frequency range. The radio frequency range includes frequencies of 3 KHz to 300 GHz that may be associated with wavelengths in free space of 100 km to 1 mm, respectively. Several sub-ranges of the RF range may be used. For example, the microwave frequency range (300 MHz-300 GHz), 10 MHz to 10 GHz, 3 KHz-50 MHz, 50 MHz-1 GHz, 1 GHz-5 GHz, and 5 GHz to 10 GHz. Some embodiments may make use only of specific ranges approved by local regulations for industrial, scientific, or medical use (ISM), including, for example, 6.765-6.795 MHz; 13.553-13.567 MHz; 26.957-27.283 MHz; 40.66-40.70 MHz; 433.05-434.79 MHz; 902-928 MHz; 2.400-2.500 GHz; and 5.725-5.875 GHz.

In some embodiments, processor 150 may be configured to control the RF radiation applied to object 103 located in an energy application zone (e.g., cavity 102). The energy application zone may include any cavity, void, location, region, or area where electromagnetic energy (e.g., RF energy) can be applied. The cavity surfaces may be RF-reflective, for example, metallic surfaces. The cavity may support standing and/or quasi-propagating waves at the RF frequency range or at a portion thereof. The cavity may be hollow or may be filled or partially filled with liquids, solids, gases, or combinations thereof.

Object 103 located in the energy application zone may include a liquid, semi-liquid, solid, semi-solid, or gas, depending upon the particular process that is utilized. The object may also include composites or mixtures of matter in differing phases. Thus, by way of non-limiting example, the object (e.g., object 103) may include food to be defrosted or cooked, clothes or other wet material to be dried, frozen organs to be thawed, chemicals to be reacted, fuel or other combustible material to be combusted, hydrated material to be dehydrated, gases to be expanded, liquids to be heated, boiled or vaporized, or any other material for which there may be a desire to apply RF energy in a controlled manner.

In some embodiments, apparatus 100 may include at least one RF energy supply component configured to supply RF energy for application to the radiating elements. An energy supply component may include any component involved in generating; modifying; and/or directing RF energy towards a radiating element and/or from a radiating element (e.g., reflected and or transmitted RF signals received by the radiating element, e.g., by the antennas). For example, such components may include an RF energy source (e.g., source 112), power supplies (e.g., power supply 113), signal generators that produce low power RF signals, amplifiers that amplify the low power RF signals to obtain high power RF signals (e.g., amplifier 116). In addition, the RF energy supply components may include components that may interact with and/or alter the RF signals (e.g., couplers, filters, detectors), direct the signals (e.g., insulators, circulators, couplers), and/or pass the signals (e.g., transmission lines). For example, RF energy supply components may also include one or more RF transmission lines configured to carry RF signals. Such transmission lines may include one or more coaxial cables, e.g., cable 117. Additionally, RF energy supply components suitable for use in the presently disclosed embodiments may include splitters, couplers, isolators, circulators, or any other components that take part in supplying RF energy for application to radiating elements 110, 111.

In some embodiments, an RF energy supply component may include a plurality of components that can be treated as a single unit, for example, for maintenance purposes. In one embodiment, all the components residing on a single board may be considered as one RF energy supply component. Additionally or alternatively, a device that is typically replaced as a single unit by a technician in the field, and includes several components may be considered as one RF energy supply component.

In accordance with some embodiments, e.g., some embodiments illustrated in FIG. 1A, apparatus 100 may include an energy application unit 119 configured to generate and supply RF energy. Energy application unit 119 may include several components. In some embodiments, energy application unit 119 may include a power supply 113 configured as a source of RF energy. Power supply 113 may include an electromagnetic field generator, electromagnetic flux generator, and/or any mechanism for generating vibrating electrons. Energy application unit 119 may also include one or more modulators (e.g., modulator 115) and/or one or more amplifiers (e.g., amplifier 116). Modulator 115 may include a phase modulator, a frequency modulator, an amplitude modulator, an oscillator or any other modulator configured to modulate at least one aspect of the RP energy supplied to the radiating element. In some embodiments, the power supply, the modulator, and the amplifier may each be controlled by processor 150.

Figure 1B:
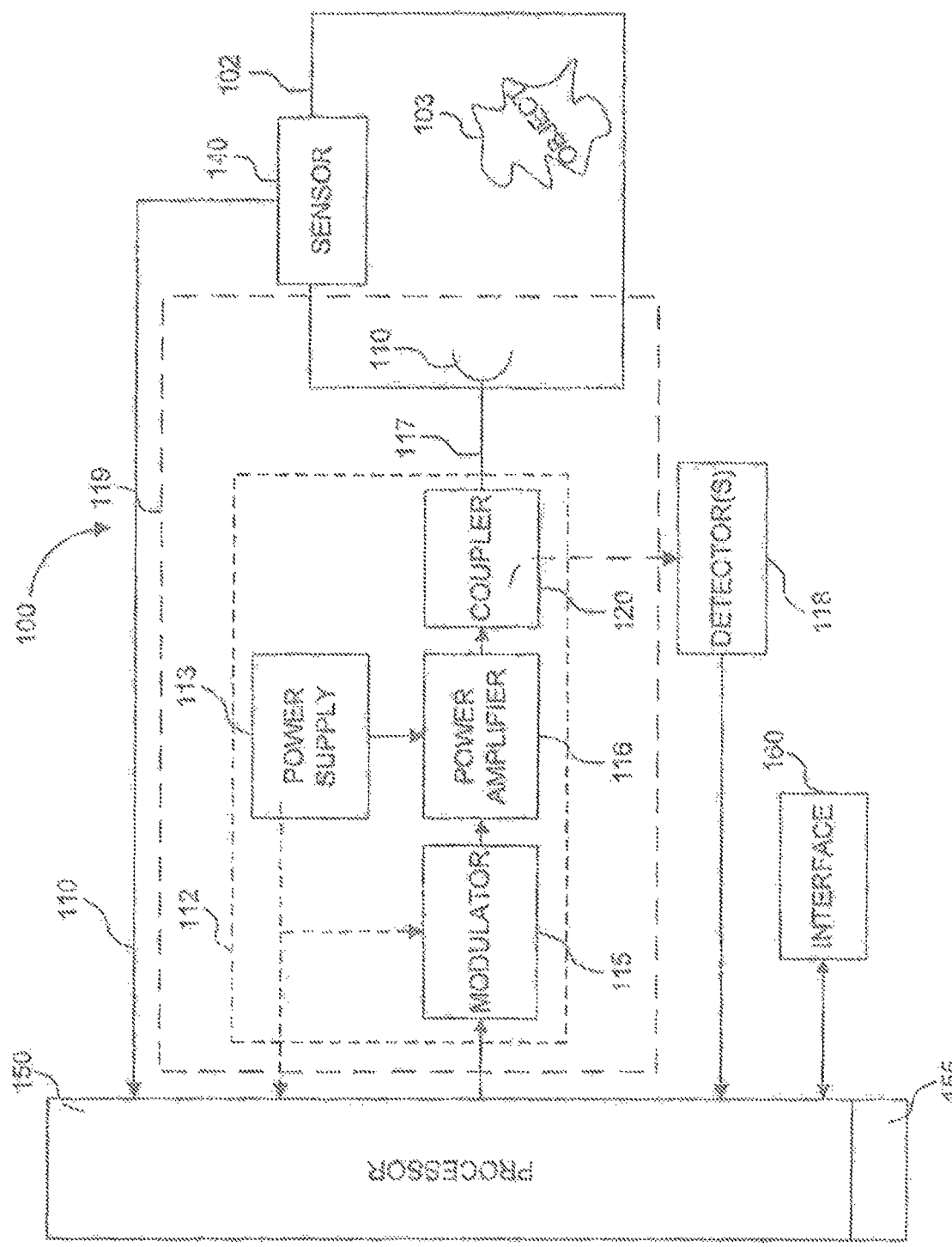
FIG. 1B is a diagrammatic representation of an exemplary apparatus according to some disclosed embodiments.

In some embodiments, e.g., embodiments illustrated in FIG. 1B, high power RF may be generated by amplifier 116, based on direct power and/or current supplied thereto from power supply 113, and a low-power RF signal supplied thereto by modulator 115. Power supply 113 may further supply direct voltage to low-power consumers, such as processor 150 and modulator 115 (see dashed arrows in FIG. 1B). Modulator 115 may include a phase modulator, a frequency modulator, an amplitude modulator, an oscillator, a DDS (Direct Digital Synthesizer) or any other component or more than one component, collectively configured to generate a low-power RF signal with control over at least one of frequency and phase. The low power RF signal generated by modulator 115 may be injected to power amplifier 116, which, in turn, may output high power RF signals.

It is noted that the term "modulation" is used herein in the sense of modification, e.g., of a CW (carrier wave) excitation; and not in the sense of modulating a carrier to transfer information. The term signal is used to refer to any RF signal, whether modulated to carry information or not. In some embodiments, the power supply, the modulator, and the amplifier may each be controlled by processor 150.

In some embodiments, apparatus 100 may include an interface (e.g., interface 160) through which communication between apparatus 100 and external entities may take place. The external entities may include, for example, other apparatuses, a user, a memory, the Internet, etc. In some embodiments, processor 150 may be configured to receive from interface 160 one or more processing instructions and/or other information related to the object or to steps or conditions for processing the object. Additionally or alternatively, information relating to the various components of apparatus 100 may be supplied via interface 160 (e.g., upon replacement of one or more of the components of apparatus 100). Interface 160 may include any structures, components, and/or software-based interface elements suitable for acquiring or passing information to processor 150. For example, in some embodiments, interface 160 may include a user interface, e.g., a GUI (graphical user interface), a touch screen, a key pad, keyboard, a display screen, mouse, pointer device, or other input, output, or I/O device. For example, interface 160 may include a device capable of reading and receiving information from a machine readable element including, for example, a barcode reader, an RFID reader, etc. In some embodiments processor 150 may be configured to communicate wirelessly through interface 160 (e.g., via infrared or optical signals, RF signals, Bluetooth, Zigbee, WiFi etc.) with one or more devices (e.g. smartphones, data readers, etc.) associated with apparatus 100. In some embodiments, interface 160 may be configured to communicate with devices located remotely from apparatus 100. Interface 160 may also include a wide area network (WAN) connection, local area network (LAN) connection, Ethernet connection, and/or Internet connection.

In accordance with some embodiments, apparatus 100 may include at least one RF detector (e.g., detector 118). The at least one RF detector may be configured to measure and/or detect various parameters of the emitted and/or received RF energy emitted by- or received from at least one radiating element Detector 118 may include a dual directional coupler (e.g., coupler 120 shown in FIG. 1B), configured to distinguish between signals going forward and backward, and allow measuring one of them separately from the other. Accordingly, detector 118 may detect and/or measure feedback related to the RP energy emitted and/or received. For example, dual directional coupler 120 may sample a given portion of the power going forwards in transmission line 117 and send it to detector 118 during a first time slot. In addition, dual directional coupler 120 may sample a given portion of the power going backwards in transmission line 117, and send it to detector 118 during a second time slot. Detector 118 may measure the amount of power it receives in the first and second time slots, and output to processor 150 a ratio between the two amounts of power. Dual directional coupler 120 may be a single device, or any combination of devices (e.g., a three-port circulator with two directional couplers) that allow separate measurements of signals that income and outgo at the same time.

In some embodiments, dual directional coupler 120 may be of medium directivity, or even of low directivity, for example, dual directional coupler 120 may have lower directivity than a benchmark dual direction coupler. The directivity of a dual directional coupler is a measure of its ability to distinguish between the incoming and outgoing signals, and separate them accurately. Low directivity may be directivity below 15 dB, and medium directivity may be directivity between 15 dB and 30 dB. Directivity may be measured as generally known in the art, for example, as a difference in dB between power output of two coupled ports of a coupler, when power is transmitted in a constant direction on the main line. Directivity above 30 dB may be considered good. Medium and low directivity couplers may have significant systematic errors. In some embodiments, such systematic errors may be accounted for by error-correction coefficients. These coefficients may be used for determining actual values from measured values, for example, to correct values of measurement results from a medium or low directivity coupler, to be closer to the values that would have been measured by a benchmark coupler having good directivity.

Apparatus 100 may further include a sensor (or several sensors), such as sensor 140. The sensor(s) may be installed in or around energy application zone 102. In accordance with some embodiments, sensor 140 may include a thermometer configured to measure the temperature of the object, the atmosphere around the object or elsewhere in the energy application zone, walls of the cavity, etc. To such an end, sensor 140 may include a thermocouple or an IR sensor. Sensor 140 may include a humidity sensor, a pressure sensor (e.g., a barometer or a manometer), a pH sensor configured to measure the pH value of a solution when the object comprises liquids. In some embodiments, sensor 140 may contact object 103, for example, the object may be a glass full of water, and the sensor may be a pH meter immersed in the water. Detector 118 and sensor 140 may communicate with processor 150 using communication lines (e.g., illustrated in FIG. 1A as arrows). Sensor 140 together with detector 118 may be configured to detect and/or measure feedback from cavity 102. The feedback may include electromagnetic feedback related to one or more detectable electromagnetic parameters including, for example, power, energy, current, voltage, phase differences between signals. Some detectable parameters may be frequency-dependent, or, more generally, may be excitation-setup dependent, i.e., depend on the setup at which electromagnetic fields are excited in cavity 102, and may be defined only in the context of RF application. Some other feedback parameters may be defined independently of the RF application, for example, temperature, humidity level, pressure, and/or any other feedback parameter that may be measured, for example, by sensor 140.

Figure 2:
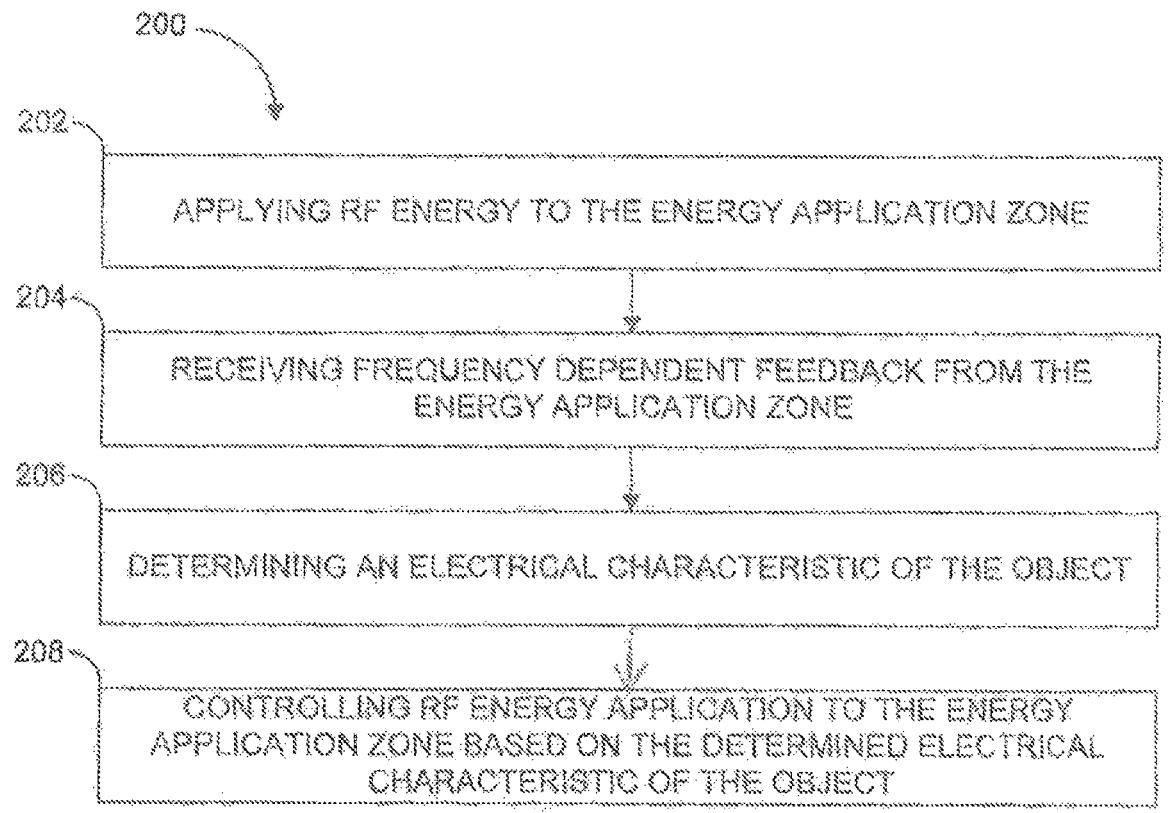
FIG. 2 is a flow chart of an exemplary method for processing an object in an apparatus according to some disclosed embodiments.

Flowchart 200 in FIG. 2 represents an exemplary method for applying RF energy to an energy application zone in accordance with some embodiments. In step 202. RF radiation can be emitted to the energy application zone (e.g., cavity 102) via one or more radiating elements, e.g., in response to RF energy applied to radiating elements 110 and 111. In step 204, the controller (e.g., processor 150) can receive feedback from the energy application zone (e.g., frequency-dependent feedback from detector 118, and/or frequency independent feedback from sensor 140). In step 206, the processor, based on the received feedback, can determine an electrical characteristic of the object (e.g., the electrical response of the cavity with the object therein to the RF radiation emitted to the cavity). And in step 208 the processor may control further application of RF energy to the radiating elements based on the feedback received and/or the determination of a characteristic of the object.

Application of the RF energy to the radiating elements and emission of RP radiation to the energy application zone may be referred to herein as application of RF energy to the energy application zone or as application of RF energy to the object. RF energy application to the energy application zone may occur in various different stages. For example, in some embodiments, the RP energy may be applied during a scanning stage or during a processing stage. In flowchart 200, a scanning stage may include step 202, and a processing step may include step 208. During scanning stages, RF energy may be applied in order to determine one or more characteristics of object 103 (e.g., based on feedback received from the energy application zone). One type of characteristics of object 103 may be an electrical characteristic that characterizes the object located in the cavity. For example, an amount of power absorbed in the cavity with the object therein may be considered an electrical characteristic of the object. Such a characteristic may also be referred to herein as a characteristic associated with the object. During processing stages, RF energy may be applied to the energy application zone in order to process object 103 (e.g., through absorption by the object of applied RF energy). In some embodiments, RF energy may be applied during the scanning stage in order to determine energy application parameters to be used during the processing stage. The energy application parameters may include, for example, what frequencies to use for the processing, for what durations, at what power levels, how much power to use for the processing, or any other controllable parameter that may characterize the application of the RF energy during the processing stage. For example, feedback received from the energy application zone during a scanning stage may be used to determine an electrical characteristic of the object, and the latter may be used to determine how much RF energy to apply during the processing stage.

As used herein, the term "electromagnetic (EM) feedback", also referred simply as the "feedback", may include any received signal or any value calculated based on one or more received signals, which may be indicative of the dielectric response of the cavity and/or the object to electromagnetic fields excited in the cavity. In some embodiments the EM feedback is frequency dependent. For example, EM feedback may include input and output power levels, network parameters. e.g., S parameters. Y parameters, Z parameters, reflection and transmission coefficients, impedances, etc., as well as values derivable from them. Examples of derivable values may include dissipation ratios (discussed below), time or frequency derivatives of any of the above, time and/or frequency averages of any of the above, etc. The electromagnetic feedback may be represented by complex numbers. For example, an S parameter of the cavity with the object therein (e.g., S11) may be represented by a complex number, having a magnitude and a phase. In some embodiments, the magnitudes alone may be used in determining the electrical characteristics of the object. In other embodiments, the phases may also be considered in determining the electrical characteristics of the object. The EM feedback may be excitation-dependent, for example, the feedback may include signals with values that vary over different excitation setups. The excitation setups may differ from one another by frequency, phase difference, or any other variable controllable by processor 150 that may affect the field pattern excited in the energy application zone. Accordingly, electromagnetic feedback measured when energy is applied at various excitation setups may be used for controlling energy application. In some embodiments, the electromagnetic feedback may be indicative of the temperature, weight, position, volume, material density and shape, or any other characteristic of the object. Additionally or alternatively, non-electromagnetic feedback may be used for determining some of the above-mentioned characteristics of the object.

Scanning and processing stages may be applied in any suitable order or for any suitable duration depending on the requirements of a particular application. For example, in some embodiments, a scanning stage may occur prior to a processing stage such that one or more characteristics of the object to be processed may be determined during or as a result of the scanning stage. This information may be used to determine various RF energy application parameters to be used during one or more subsequent processing stages. The energy application parameters may include, for example, selection of frequencies, order of energy application at different frequencies, power levels at which the energy is to be applied at each of the frequencies, time duration for energy application at each frequency, total amount of energy to be applied to the object at all the frequencies, etc. In some embodiments, scanning and processing stages may be interleaved such that a processing stage (or a number of processing stages) follows each application of a scanning stage. For example, a scan of the cavity including the object may be executed according to step 202 at predetermined intervals, e.g., every second, every minute, every ten minutes, or at any other suitable time. The specific interval may be determined based on the specific application. Subsequent to some or all of the scanning stages, RF energy may be applied to the object in order to process the object, for example, according to step 208. In some embodiments, the scanning and processing stages may overlap such that scanning is performed (e.g., feedback from the energy application zone may be monitored (step 204) while processing of the object is occurring through application of RF energy (step 208). In such an embodiment, the application of RF energy may be controlled (e.g., adjusted, maintained, etc.) in response to feedback received from energy application zone 102 during a processing stage. In some embodiments, processing may be stopped for a short while, and RF energy may be applied for feedback gathering only. Then, the feedback may be used to determine energy application parameters, and processing may commence again with the newly determined energy application parameters. Such cases may also be considered to include feedback receipt during processing, even if not during a processing stage.

The scanning stages may be initiated at any suitable intervals. For example, as previously noted, scanning stages may be initiated at predetermined time intervals. Alternatively or additionally, scanning stages may be initiated after a predetermined amount of energy has been emitted from the one or more radiating elements or after a predetermined amount of energy has been absorbed in the cavity, or after any other predetermined event occurs. For example, a scanning stage may be started each time a processing stage is completed. For example, a processing step may include energy application at a group of excitation setups, and after energy is applied at each of the excitation setups in the group (e.g., once, twice, or any other predetermined number of times), a scanning stage may be initiated.

The rate at which scanning stages are initiated may also depend on feedback received from the cavity. For example, the initiation of scanning stages may depend on the determined rate of change in one or more characteristics associated with the object (e.g., temperature, RF energy absorption characteristics, etc.). Where a characteristic of the object is changing rapidly, the rate of initiation of scanning stages may be increased. Conversely, where the rate of change of a monitored characteristic is slower, the time intervals between scanning stages may be increased.

During the scanning stage, an amount of energy may be applied to the energy application zone that is sufficient to enable determination of a characteristic of the object without substantially processing the object. For example, the amount of energy applied during a scanning stage may be insufficient to appreciably heat a food item, thaw a frozen object, cause or accelerate a chemical reaction, etc. Such an amount of energy may be applied during the scanning stage, for example, by applying relatively-low RF power levels from the RF source (relative to the RF power levels used to process the object) and/or by applying RF energy during the scanning stage for a shorter time period at each excitation setup than during the processing stage. Whether the power level or the applied time duration or both are lowered during the scanning stage, in embodiments where scanning and processing are separately accomplished, the amount of energy applied during scanning stages may be lower than an amount of energy applied during a processing (e.g., heating) stage, even when the number of excitation setups used in the processing stage is smaller than that used in the scanning stage. In some embodiments, the scanning stage may include energy application at a large number of excitation setups, and only a portion of these excitation setups may be selected for application in a processing stage. The selection may be based on electrical characteristics of the object detected at different excitation setups during the scanning stage. In some embodiments, processing may take place at excitation setups that were not applied during the scanning stage. For example, the electrical characteristics of the object determined based on a given excitation setup may be used to process the object at other excitation setups. For example, during a scanning stage energy may be applied through each of the radiating elements separately, and based on the feedback obtained, electrical response of the object to energy application at two or more radiating elements together may be calculated. This calculated electrical response may be a basis for deciding on energy application during the processing stage.

During the processing stage, an amount of energy may be applied to the energy application zone that is sufficient to process the object and change one or more characteristics of the object. For example, the amount of energy applied during a processing stage may be sufficient to cook a food item, thaw a frozen object, cause or accelerate a chemical reaction, change the temperature of an object by a measurable amount, change the RF energy absorption characteristics of the object, cause a phase change in the object, dry the object, etc.

Based on the feedback received in step 204, in response to RF energy application in step 202, the characteristic of the object may be determined in step 206. In turn, the RF energy applied to the object in step 208 may be controlled using the characteristic determined based on the received feedback. Examples of characteristic determined based on the received feedback may include dielectric properties of the object (e.g., the object's dielectric constant or loss tangent), RF absorption characteristics of the object, network parameters of the cavity with the object therein, characteristics derivable from such network parameters, dielectric properties, and RF absorption characteristics, and more.

Processor 150 may be configured to control application of the RF energy to the radiating elements by controlling various parameters. For example, in some embodiments, RF energy may be applied to the energy application zone based on two or more different RF energy excitation setups. Applying energy at different excitation setups may result in excitation of different field patterns in the energy application zone. The excitation setups may differ from one another by one or more values of parameters that may affect the field pattern established in the energy application zone and may be controlled by processor 150. Such a parameter is referred to herein as a controllable field affecting parameter (c-FAP). In some embodiments, a value may be selected for each c-FAP (e.g., the value 800 MHz may be selected for the frequency c-FAP), and the excitation setup may be defined by the selected values. Varying a selected value of even one c-FAP varies the excitation setup, which, in turn, may vary the field pattern excited in the energy application zone.

In some cases, varying values of c-FAPs may result in significant variations in the generated field patterns. In other instances, however, varying values of c-FAPs may produce little or no change in the generated field patterns (e.g., if the variation between the two values of the c-FAP is small).

To obtain a mental image of an excitation setup and how it may be set, one may imagine an energy application unit according to some embodiments of the invention to be controlled from a switchboard. The switchboard may include a set of knobs, dials, switches, or other value-selectors, each for determining the value of (or selecting a value for) one c-FAP. Switching from one excitation setup to another may be accomplished by manipulating one (or more) of the value-selectors to select a different value. The position of all the value selectors collectively (e.g., the positions of all the knobs, dials and switches collectively) may define a single excitation setup. While this mental image may be helpful, in practice, an energy application unit may be controlled by a processor, which may set the values of the available c-FAPs by using micro-switches, transistors, electronic circuitries, and other value selectors, which may look differently than knobs and dials.

Applying energy at a particular excitation setup may excite RF field in the energy application zone. For brevity, this RF field may be referred to as an excitation. Thus, each excitation setup may correspond to an excitation; and a reference to supply, reception, absorption, leaking, etc. of an excitation setup may refer to supply, reception, absorption, leaking, etc. of the corresponding excitation. Thus, for example, a statement that a given excitation or excitation setup is dissipated in the cavity may mean that electromagnetic field excited by the energy application unit (e.g., unit 119) at the given excitation setup is dissipated in the cavity.

Different apparatuses may be able to control different field affecting parameters. For example, in some embodiments, processor 150 may control the frequency of an RF wave applied by energy application unit 119 to cavity 102. In such embodiment, the frequency may be available as a controllable field affecting parameter (c-FAP). In one example, processor 150 may control the frequency to have any of two or more values, e.g. 800 MHz, 800.5 MHz, 805 MHz, 900 MHz, etc. By controlling the frequency and changing from one frequency value to another, the excitation setup may be changed, which, in turn, may change the pattern of the electromagnetic field excited in the energy application zone.

In another example, a difference between intensities at which two radiating elements emit electromagnetic fields of the same frequency (e.g., at the same time) may be controlled, and thus may be available as a c-FAP.

In another example, an energy application zone (e.g., cavity 102) may include one or more conductive elements (e.g., rods), each of which may be controlled, e.g., by processor 150, to be either in a parasitic state or in a ground-shunted state. The value of the state of each rod (i.e. parasitic or ground-shunted) may affect the RF field pattern excited in the energy application zone. In apparatuses having such rods, the state of each rod may constitute a c-FAP.

In another example, an energy application zone may include a magnetizable element (e.g., at a wall of the energy application zone) and an electromagnet near the magnetizable element. The magnetizable element and the electromagnet may be arranged such that a field pattern excited in the energy application zone may be affected by current flowing in the electromagnet. In embodiments, processor 150 may be configured to control the value of the current (e.g., 1 mA, 20 mA, 500 mA, etc.). The value of the current may be available as a c-FAP.

Other examples of parameters that may serve as controllable field affecting parameters in some embodiments may include the position of a radiating element, orientation of a radiating element, position and/or orientation of conducting elements in the energy application zone, cavity dimensions, or any other controllable parameter, the value of which may affect the field pattern excited in the energy application zone upon RF energy application to the zone.

Excitation setups (ES) of apparatuses configured to control only a single c-FAP may be referred to as one-dimensional excitation setups. An excitation setup of an apparatus that controls multiple c-FAPs may be referred to as multi-dimensional excitation setup. For example, an apparatus configured to control the state of each of six rods to be either parasitic or ground-shunted may have six-dimensional excitation setups. Two examples of such excitation setups may be: (parasitic, parasitic, parasitic, ground-shunted, ground-shunted, ground-shunted), and (parasitic, ground-shunted, ground-shunted, parasitic, parasitic, ground-shunted). In general, the number of c-FAPs available to an apparatus determines a dimension of the excitation setups available to the apparatus. The collection of all the excitations that may be excited by an apparatus (or the collection of all the excitation setups available to an apparatus) may be referred to as the excitation space of the apparatus. The dimension of an excitation space of an apparatus may be the same as the dimension of each excitation setup available to that apparatus.

In some embodiments, energy application may be controlled such that one or more aspects of energy application at a given excitation setup (e.g., amount of energy, power level at which energy is applied, time duration at which energy is applied etc.) may depend on the EM feedback received to the same excitation, to a different excitation, or over multiple excitations.

The control may be by a processor, which may be referred to herein also as a controller. The controller (e.g., processor 150) may be configured to select a subgroup of excitation setups (or at least one excitation setup), from all the excitation setups available to the apparatus, to apply RF energy to cavity 102. The controller may select subgroup of excitation setups based on the EM feedback received during a scanning stage.

In some embodiments, the controller may be configured to determine amounts of RF energy to be applied at each excitation setup (e.g., associate RF energy amounts with each of the excitation setups), for example—based on the EM feedback. In certain embodiments, the controller may be configured to determine, from at least a part of the feedback a characteristic of the object, e.g., an Absorbability Indicator, (or in short, AI) at each of a plurality of excitation setups in which energy is applied to the energy application zone. The controller may be configured to associate RF energy amounts with each of the excitation setups available for an apparatus based on the AI value at the respective excitation setup. In some embodiments, the controller may determine not to supply RF energy to excitation setups associated with certain AI values, for example, lower than a minimum threshold and/or higher than a maximum threshold. In some embodiments, the controller may associate the same amount of RF energy with excitation setups associated with different AI values, for example, with values in a certain range. Additionally or alternatively, the controller may associate different amounts of RF energy with excitation setups associated with different AI values. In some embodiments, other rules based on the AI values and/or other EM feedback may be utilized by the controller for determining the amounts of RF energy to be applied, or other energy application parameters.

Applying RF energy to the energy application zone may be done by a sweep, and EM feedback may be received and associated with different excitation setups during the sweep. As used herein, a sweep may include, for example, the application over time of energy at more than one excitation setup. For example, a sweep may include the sequential application of energy at multiple excitation setups in one or more contiguous excitation setup groups; the sequential application of energy at multiple excitation setups in more than one non-contiguous excitation setup group; the sequential application of energy at individual non-contiguous excitation setups; and/or the application of synthesized pulses having a desired excitation setup/power spectral content (e.g., a synthesized pulse in time). The excitation setups groups may be contiguous or non-contiguous. Thus, during an excitation setup sweeping process, the controller may regulate the energy supplied from an energy source (e.g., source 112) to the at least one radiating element to sequentially apply RF energy at various excitation setups to cavity 102, for example, by switching from one c-FAP to the other, and to receive EM feedback from cavity 102 received in response to application of the RF energy at each excitation setup.

During the sweeping process, processor 150 may receive EM feedback indicative of the energy reflected and/or coupled at radiating elements 110, 111. Reflected energy may be energy emitted and received by the same radiating element (e.g., when the same radiating element emits RF energy and all the rest—do not). Coupled energy may be energy received by one radiating element from another radiating element (e.g., when the receiving radiating element does not emit, and another radiating element emits). Processor 150 may determine the AI of object 103 at each of a plurality of excitation setups based on the received information. Consistent with some disclosed embodiments, an absorbability indicator (AI) may include values of dissipation ratio (referred to herein as DR) associated with each of a plurality of excitation setups. As referred to herein, in some embodiments, a dissipation ratio (or absorption efficiency or power efficiency) may be associated with an emitting radiating element, such that each radiating element may be associated with a different dissipation ration. In some embodiments, a dissipation ratio may be associated with the cavity, for example, when multiple radiating elements emit together at the same frequency, and the amount of energy absorbed in the cavity may be larger than the. A dissipation ratio may be defined as a ratio between RF energy absorbed by object 103 and RF energy supplied into the energy application zone. A dissipation ratio associated with one of the radiating elements may be defined as a ratio between RF energy dissipated in cavity 102 and RF energy supplied into the energy application zone by that radiating element, also referred to herein as the emitting radiating element.

In some embodiments, a dissipation ratio associated with an emitting radiating element (e.g., element 110/11) may be calculated using Equation (1):

$$DR = D/S \quad (1)$$

wherein S is the energy supplied by source 112 to the emitting radiating element (e.g., radiating element 110), and D is the energy dissipated, for example in cavity 102 having object 103 therein. S may be determined by integrating over time power detected by a power detector exposed to the energy supplied to radiating element 110/111. Similarly, D may be determined by monitoring (e.g., using detector 118) the energy returned to radiating element 110/111 and subtracting that amount from S. In some embodiments, D and S may be defined as powers, rather than energies, and time integration may be omitted.

In some embodiments, for example, when each radiating element emits at a time or when different radiating elements emit simultaneously at different frequencies, the dissipation ratio may be calculated based on S parameters, for example, according to equation (1a):

$$DR_j = 1 - \Sigma_i |S_{i,j}|_2 \quad (1a)$$

Wherein $S_{i,j}$ is the ratio between backward voltage at radiating element i and forward voltage at radiating element j when radiating elements other than j don't emit.

During the RF energy application, additional parameters may be calculated and monitored based on the dissipation ratio. In some embodiments, an average dissipation ratio, for example, averaged over all transmitted excitation setups (ES), may be calculated, optionally for each radiating element, as a function of time, using equation (2):

$$\overline{DR} = \frac{1}{N} \sum_i DR(ES_i) \quad (2)$$

Wherein $DR(ES_1)$ is the dissipation ratio measured when the RF energy was supplied using the ith excitation setup, and i is an integer between 1 to N, wherein N is the number of excitation setups used to transmit energy to the energy application zone in a particular application, e.g., in a particular scanning stage. The average dissipation ratio may vary over time.

In some embodiments, a reflection coefficient $\Gamma_1$ may be used as an absorbability indicator of the object. This AI may be defined for radiating element i as presented in equation (3):

$$\Gamma_i = \frac{\sum R_i}{S_i} \quad (3)$$

where $S_i$ represents the amount of energy (or power) supplied to the emitting radiating element having the index i, and $\Sigma R_i$ represents the sum of all amounts of energy (or power) received by radiating element i from all the radiating elements. The reflection coefficient Γ (gamma) may be used when more than one emitting radiating element emit RF energy simultaneously, while S parameters are measurable only if RF energy is applied through one radiating element at a time. The above definition of the reflection coefficient $\Gamma_i$ provides for the magnitude of the reflection coefficient. In some embodiments, the reflection coefficient may have a phase, which may also be part of the AI, or be treated as an independent AI.

In some embodiments, for example, when various radiating elements emit simultaneously at the same frequency, the dissipation ratio may be calculated based on gamma coefficients, for example, according to equation (1b), $$DR = 1 - \frac{\sum_{i=1,N} \left|\frac{V_i^+}{V_1^+}\right|^2 |\Gamma_i|^2}{\sum_{i=1,N} \left|\frac{V_i^+}{V_1^+}\right|^2} \quad (1b)$$

Wherein $|V_i^+|^2$ is the power that goes into the cavity through feed i.

Additionally or alternatively the average DR may be an AI. This AI may be frequency independent (e.g., averaged over frequency), and/or time dependent. Thus an average over N excitation setups as a function of time is presented in equation (4):

$$\overline{DR(t)} = \frac{1}{N} \sum_i DR(t)(ES_i) \quad (4)$$

Such an average DR may serve as an example to an EM feedback parameter that is independent of frequency or excitation setup (e.g., if the DR is averaged over all the available excitation setups). In certain embodiments, processor 150 may be configured to determine RF energy application parameters at each excitation setup based on the EM feedback, and control energy application unit 119 to apply RF energy at the determined energy application parameters. EM feedback may be received from the energy application zone, e.g., during sweeping over a plurality of excitation setups. In some embodiments, processor 150 may determine that amounts of energy applied at some excitation setups may be related to the AI calculated for the respective excitation setups (e.g., substantially inversely related, linearly related, related by some other function, or related according to any other suitable mapping scheme).

Returning to the method outlined in FIG. 2, varying a selected value of even one c-FAP varies the excitation setup, which, in turn, may vary the field pattern excited in the energy application zone. The RF energy application in step 202 may be conducted by sweeping over a plurality of excitation setups available to apparatus 100 (e.g., at a plurality of frequencies, phase differences between multiple radiating elements emitting coherently, etc.), for example, by transmission over time of energy at more than one excitation setup. Controller/processor 150 may control the RF energy application by sweeping over a plurality of excitation setups, e.g., excitation setups selected based on the received feedback, and causing application of a certain amount of energy (e.g., a constant amount of energy) to be applied at each swept excitation setup.

Some aspects of the present disclosure may involve detecting, measuring, or sensing RF energy emitted from one or more radiating elements to the energy application zone and/or RP energy received by one or more radiating elements from the energy application zone. Specifically, in some embodiments, processor 150 may receive feedback from the energy application zone, e.g., in step 204. The feedback may be received from detector 118 and/or from sensor 140 configured to measure feedback related values in the energy application zone. Such feedback may be collected during the scanning stage, during the processing stage, and/or during a combined scanning/processing stage.

In accordance with some embodiments, monitoring of the feedback may be time dependent e.g., received every 0.1 milliseconds, every 10 minutes, or at any other suitable time rate. Alternatively, acquisition of feedback may be triggered by a change in temperature, a certain amount of RF energy emitted, absorbed, or any other suitable event. In some embodiments the feedback may include energy supplied to each emitting radiating element from the RF source, the energy reflected back from the cavity to the emitting radiating elements, the energy coupled to the other radiating elements acting as receiving elements, the input impedance measured on each radiating element, the S-parameters associated with the cavity, etc. The feedback may also include any mathematical manipulation of the signals received from the energy application zone, for example, the dissipation ratio, the average dissipation ratio, a time derivative of any of the signals (for example, Group Delay values for the phase component), or any other feedback that depends on the excitation setup.

Various feedback related values may be received by the controller during the application of RF energy at various excitation setups, for example, during sweeping over a plurality of excitation setups. In one embodiment, the feedback may be received for each of a multiple of frequencies of RF radiation emitted from the at least one radiating element. In another embodiment, the received feedback may include information associated with each of the one or more radiating elements separately (e.g., by receiving feedback while one or more radiating elements radiate and other radiating elements are not radiating). In another embodiment the received feedback may include values associated with one or more network parameter values, associated with a response of the cavity to emission of the RF radiation.

Figure 3A:
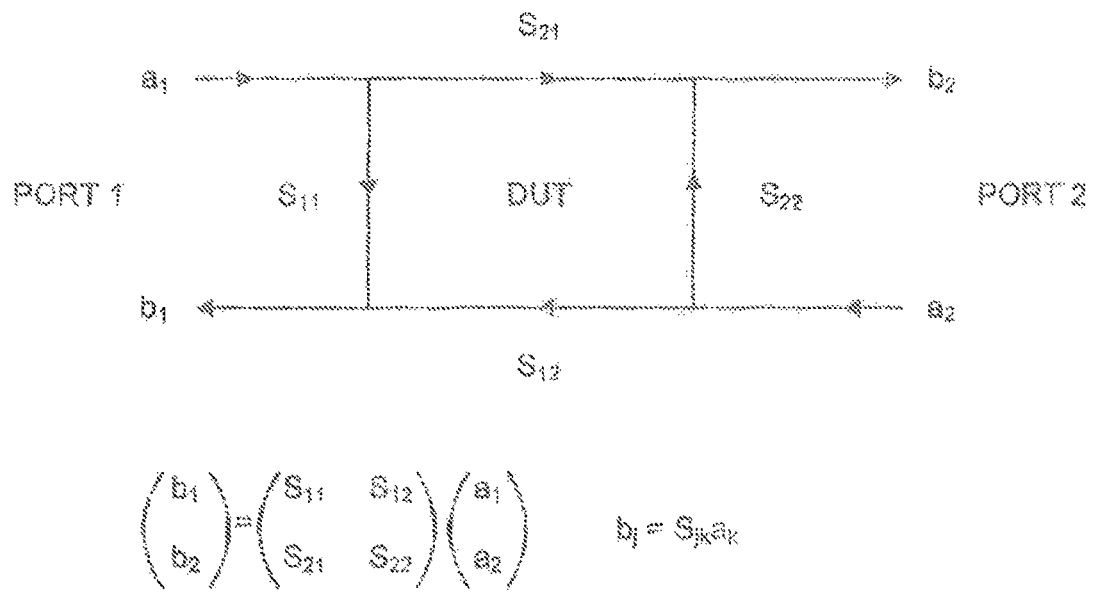
FIG. 3A is a diagrammatic representation of a 2-port device connected to two 2-port cables, according to exemplary disclosed embodiments.
Figure 3B:
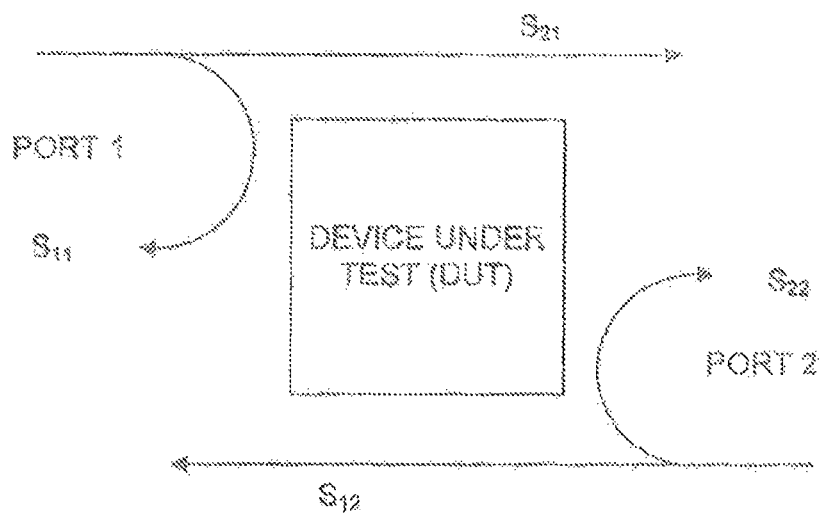
FIG. 3B is another a diagrammatic representation of a 2-port device connected to two 2-port cables, according to exemplary disclosed embodiments.

As used herein, network parameters, e.g., Scattering Parameters (S-parameters), may refer to the electrical behavior of some portion of the system (e.g., cavity 102, transmission line 117, and/or any of the RF energy supply components included in apparatus 100) when exposed to various electrical signals. The S parameters may have complex values, and may be frequency dependent. For example, S-parameter values may describe how a device or component scatters incoming 'a' waves into outgoing 'b' waves. Each S-parameter may be defined as the ratio of the outgoing 'b' wave (e.g., as observed at one port) to the incoming 'a' wave (e.g., as observed at another port). These S-parameters may be represented in matrix form as $$S_{jk} = \frac{b_j}{a_k}$$

where j and k denote various observation ports used to observe the electrical behavior of a cavity, component, etc. in response to an applied electrical signal. A one-port component may be described with one S-parameter, a two-port device may be described using a 2×2 matrix, a four-port device may be described using a 4×4 matrix, etc. A two port device has two signal-return path connections as illustrated in FIGS. 3A and 3B. The connections can include any transmission line geometry (e.g., coaxial, microstrip, stripline, coplanar or twisted wire), and each port may include one signal connection and one return connection. In the diagrammatic representation of a two-port device (e.g., an RF transmission line or an RF energy source) illustrated in FIG. 3A and FIG. 3B, port 1 has wave going in, a1 and one wave returning, b1, similarly port 2 has a wave going in, a2 and one wave returning, b2, the following parameters may be used to describe electrical behavior of a two-port device:

S11 describes the reflection coefficient resulting from a wave entering from port 1, $$S_{11} = \frac{b_1}{a_1};$$

(while port 2 is OFF—not transmitting)

S21 describes the transmission coefficient originating from a wave entering from port 1

$$S_{21} = \frac{b_2}{a_1};$$

(while port 2 is OFF—not transmitting)

S12 describes the transmission coefficient, $$S_{12} = \frac{b_1}{a_2}$$

originating from a wave entering from port 2; and (while port 1 is OFF—not transmitting)

S22 describes the reflection coefficient, $$S_{22} = \frac{b_2}{a_2}$$

originating from a wave entering from port 2. (while port 1 is OFF—not transmitting)

As previously described, at step 206, processor 150 may determine a characteristic of the object based on feedback received from zone 102. Various characteristics associated with the object may be determined based on the feedback. For example, dielectric properties of the object, object temperature, RF energy absorption characteristics, etc., may be determined based on the feedback. In some embodiments, and as described above, processor 150 may determine an absorbability indicator for the object based on feedback values associated with measured incident signals and reflected/transmitted signals. Such an AI may be determined at each of a plurality of excitation setups in which energy is applied to cavity 102.

According to some embodiments, processor 150 may be configured to determine DR based on S parameters derived from measured feedback. For example, for an N port non-coherent system (e.g., for a cavity with N radiating elements transmitting each at a time) characterized by $S_{11}$, $S_{21}$, $S_{31}$, ... $S_{N1}$, the DR for port 1 may be defined as follow: $DR=1-(|S_{11}|^2+|S_{21}|^2+|S_{31}|^2+ \ldots +|S_{N1}|^2)$. In the same manner DR values for other ports may be defined. In another example, for an n port coherent system (e.g., for a cavity with n radiating elements transmitting simultaneously at a common frequency) a dissipation ratio (DR) may be defined for the entire cavity as $$DR = 1 - \frac{\sum_{i=1}^{n}\left|\sum_{k=1}^{n}S_{ik}a_k e^{j\varphi_k}\right|^2}{\sum_{k=1}^{n}a_k^2},$$

wherein $$S_{ik} = \frac{V_i^-}{V_k^+},$$

where $V_i^-$ is voltage received at radiating element i when voltage $V_k^+$ is supplied to radiating element k, and $$a_k^2 = \left|\frac{V_k^+}{V_1^+}\right|^2.$$

In accordance with some embodiments, processor 150 may use the feedback received from the energy application zone together with stored information to determine a corrected characteristic of the object. For example, in some embodiments, processor 150 may be configured to take into account additional information, such as correction coefficients, in order to determine a corrected characteristic of the object. In the above example of determining an AI for the object, each s parameter (or Γ parameter) may be corrected, and the dissipation ratio may be calculated using the corrected parameters. In some embodiments, the corrected characteristic of the object may offer a refinement over a characteristic determined based on the feedback alone and may more closely represent actual characteristics of the object. In some embodiments, each of the RF energy supply components included in apparatus 100 may exhibit a unique response to applied electrical signals. For example, in response to an applied RF reference signal, each transmission line (e.g., cables 117), power supply 113, modulator 115, amplifier 116, and any other RF energy supply component, may respond in a unique manner that may be characterized, for example, by a unique set of S parameters for that RF energy supply component. Moreover, from one apparatus 100 to another, corresponding RF energy supply components may exhibit different responses to similar applied electrical signals. That is, in one example of apparatus 100, a certain transmission line may have a particular set of S parameters while a corresponding transmission line in another example of apparatus 100 may have a different set of S parameters. For example, the electrical responses of any RF energy supply components responsible for generating and/or carrying RF energy to a radiating element may affect, e.g., a determination of RF energy supplied to cavity 102, which, in turn, may affect a determination of the transmission coefficients of the system (and any calculation based on the transmission coefficients). Similarly, the electrical responses of any RF energy supply components responsible for receiving and/or carrying RP energy from a radiating element may affect, e.g., a determination of RF energy received from cavity 102, which, in turn, may affect a determination of the reflection coefficients of the system (and any calculation based on the reflection coefficients). It may be noted, that components after the detector (when looking from inside the cavity) should not affect the measurement results. For example, if measurements are taken by a detector directly connected to a radiating element, components after the radiating element (looking from inside the cavity) may not affect the measurement, and therefore, an actual characteristic of the object may be measured without knowledge of the electrical behavior of such components. However, if the detector is connected to the radiating element through a transmission line (that is, the detector is after the transmission line), the transmission line may affect the measurement results. For example, transmission lines of different lengths may cause different phase shifts between the radiating element and the detector.

Taking into account the electrical response of one or more of the RF energy supply components in apparatus 100 may yield more accurate determinations of object characteristics. Accounting for the particular electrical response of one or more of the RF energy supply components may also promote consistent performance across a plurality of apparatuses 100, as errors resulting from variations that may exist in RP energy supply components from one apparatus to the next would be reduced. For example, in some embodiments, the variations between corresponding parts in different apparatuses may cause differences in the final outcome of energy application from one apparatus to another. For example, using exactly the same dependencies between object characteristics and energy application parameters, one oven may cook a cake perfectly, while another oven of similar structure may over dry a similar cake. Accounting for differences in electrical behavior of the RF energy supply components may facilitate producing apparatuses that all produce similar final outcomes, for example, ovens that all cook the same kind of cake to the same final quality.

Systematic errors may be introduced into measured values due to imperfections in apparatus 100. The systematic errors may be corrected by comparing characteristics of a load (e.g., object) as measured by the device to characteristics measured by independently calibrated measuring equipment, for example, a vector network analyzer (VNA). These differences may be summarized by means of error correction coefficients. Many methods have been developed for evaluating error correction coefficients of communication equipments and RADAR systems based on measurements made at low power. Some embodiments of the present disclosure use error correction coefficients in apparatuses for processing objects in cavities by RF. In some embodiments, the error correction coefficients are calculated based on measurements made at high power (e.g., 50 W or higher). For example, the measurement may be made at power within the dynamic range of power amplifier 116.

The electrical response of one or more RF energy supply components of apparatus 100 may be captured, e.g., as error correction coefficients or network parameters, and stored in any suitable manner (e.g., in any location and/or format accessible and useable to processor 150). For example, in some embodiments, this information may be stored in a memory associated with processor 150 (e.g., memory 155), and may include one or more sets of error correction coefficients that correspond and/or represent the deviation between measurements made with an RF energy supply component included in apparatus 100, and the same measurements made with a VNA. In another example, the electrical response information may include one or more sets of network parameters that correspond and/or represent the electrical response behavior of one or more of the RF energy supply components included in apparatus 100, e.g., transmission line 117, or cavity 102. Characteristics of the object determined by processor 150 based on measured feedback and additionally based on at least one stored coefficient associated with at least one RF energy supply component of apparatus 100 may be referred to herein as corrected electrical characteristics. As noted above, corrected electrical characteristics may more closely represent actual characteristics of the object being processed than characteristics of the object determined based solely on measured feedback. For example, a corrected electrical characteristic corresponding to absorption characteristics of an object may more closely correspond to actual absorption characteristics of the object, as compared to absorption characteristics determined based on the measured feedback alone.

There are several ways to represent error correction coefficients, usually referred to as error correction terms. The methods and apparatuses described herein are not limited to any form of presentation of error correction coefficients, but may cover any set of coefficients that may be used to correct systematic errors associated with feedback measurement by apparatus 100, whether as conventional error correction terms or in any non-conventional manner. In some embodiments, the error correction coefficients are complex numbers. This may allow correcting for errors both in magnitude and in phase of object characteristics (such as an S parameter characterizing the cavity with the object therein).

The term "coefficient", as used herein, may include any real or complex number that can be used to represent a property of an RF energy supply component, e.g., the electrical response of the RF energy supply component. The coefficient may be used to transform the values of the measured response to values of a response that would have been measured with an ideal RF energy supply component. In some embodiments, the coefficient may represent how the RF energy supply component responds when electrical signal is applied to it. As discussed above, this representation may be relative to a benchmark piece of testing equipment. In some embodiments, the coefficient may represent the electrical response of the RF energy supply component itself. For example, a coefficient may include a network parameter value that can be determined using a network analyzer. In some embodiments, the memory 155 may store sets of coefficients. For example, a set of coefficients may include a set of S parameters, such as S11, S12, and S22. In some embodiments, the set of coefficients may include a set of three, eight, ten, twelve, or any other number of error correction terms. In some embodiments, the set may include a single coefficient for each frequency, and in other embodiments for each frequency there may be saved a set of coefficients. In some embodiments, the set of coefficients may include network parameter values corresponding to a ratio between a reflected signal voltage and an incident signal voltage at different frequencies. The stored coefficients may represent a ratio between a transmitted signal voltage and an incident signal voltage in the at least one RF energy supply component. Some of the coefficients may have complex values, i.e., real and imaginary values associated with magnitude and phase. In one example, the set of coefficients may comprise S-parameters that characterize the RF energy supply component.

In some embodiments, the set of coefficients may include various parameters, e.g., scattering parameters (s parameters) impedance parameters (Z-parameters), admittance parameters (Y-parameters), or transfer scattering parameters (T-parameters). According to some embodiments, apparatus 100 may include a plurality of RF energy supply components, and memory 155 may be configured to store one or more sets of coefficients associated with one, some, or each of the RF energy supply components included in apparatus 100. In other embodiments, memory 155 may be configured to store one or more sets of coefficients, each set including stored coefficients associated with a plurality of RF energy supply components (e.g., a plurality of substantially identical components) included in apparatus 100. Additionally or alternatively, any set of coefficients for an RF energy supply component may include one or more coefficients associated with some frequencies of emitted RF radiation to be used during scanning and/or processing stages.

The sets of coefficients associated with the RF energy supply components may be determined and stored in memory 155 in any suitable manner. For example, using a network analyzer, parameters S11 and S21 of a certain RF energy supply component may be determined by measuring the magnitude and phase of the incident, the reflected and the transmitted voltage signals when the output is terminated in a load that equals the characteristic impedance of the test system ($Z_0$ load). Likewise, the value of parameters S22 and S12 may be determined by placing the source at port 2 and terminating port 1 in a $Z_0$ load. The above process may be used to calculate the S-parameters of each the RF energy supply components (e.g., $[S_{transmission\ line}]$, $[S_{modulator}]$, $[S_{splitter}]$, etc.).

In some embodiments, the sets of coefficients associated with any of the RF energy supply components may be determined, and stored in a memory by the manufacturer or as part of the manufacturing process. The memory may be memory 155, some other memory associated with apparatus 100, and/or a memory located remotely with respect to apparatus 100. Additionally, or alternatively, the coefficients associated with the RF energy supply components of apparatus 100 may be determined and stored at other points along the supply chain, and not necessarily at the same location. For example, some coefficients may be determined during manufacture, and some, by a technician handling apparatus 100 at a facility of an end-user. The coefficients may be stored in a memory of apparatus 100 or associated with any of the RF energy supply components after manufacturing. For example, in some embodiments, the coefficients may be stored in memory (e.g., memory 155) as part of an initialization routine run at the time of installation (e.g., initiated by a field technician or a user, etc.). Additionally, or alternatively, apparatus 100 may be configured to autonomously test various RF energy supply components included in apparatus 100 and determine and store coefficients for the tested components.

Figure 4A:
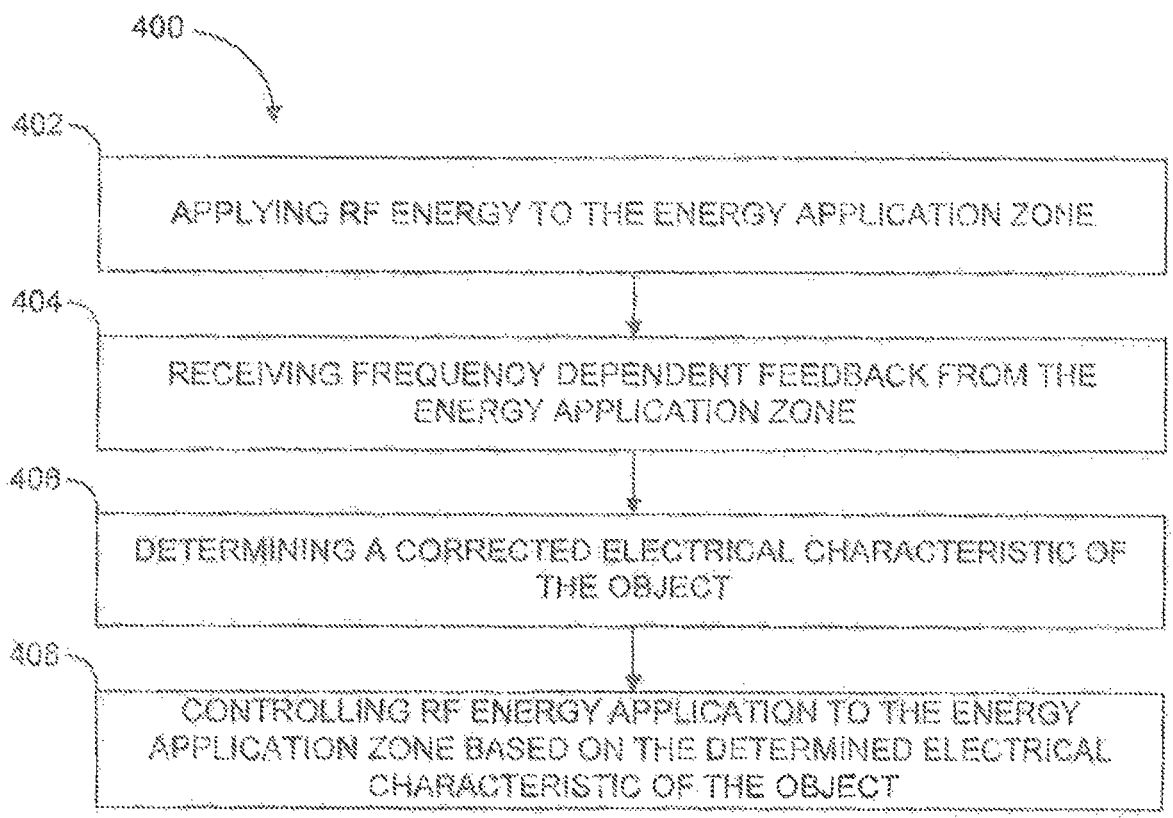
FIG. 4A is a flow chart of an exemplary method for using stored error correction coefficients for processing an object in a cavity according to some embodiments.

FIG. 4A provides an overview of an exemplary method according to some disclosed embodiments. FIG. 4A is similar to FIG. 2, except for the characteristic of the object in FIG. 4A is replaced in FIG. 4B by a corrected electrical characteristic. In addition to the measurements used to determine the electrical characteristics of the object in method 200, method 400 may use error correction coefficients saved, e.g., in memory 155, to obtain the corrected electrical characteristics of the object. In step 402, RF energy is applied to the energy application zone, and accordingly in step 404 feedback may be received in response to the applied RF energy. Such application of energy and receipt of feedback may be accomplished during a scanning stage, or during a combined scanning/processing stage. In step 406, processor 150 may determine one or more corrected electrical characteristics of the object based on the measured feedback along with stored coefficients (e.g., error correction coefficients) associated with one or more of the RP energy supply components of apparatus 100. This corrected electrical characteristic may more closely correspond to the actual electrical characteristic of the object than the characteristic determined as part of step 206 (FIG. 2) without reference to the stored coefficients. In step 408, processor 150 may control the RF energy applied to the object based on the corrected electrical characteristic of the object. The control may be further based on other input, for example, non-electrical characteristics of the object, such as weight, shape, and temperature.

In some embodiments, steps 406 and 408 may be carried out by two distinct processing units. For example, a first processing unit may be configured to correct the received feedback based on the set of coefficients; and a second processing unit may be configured to control the application of the RF energy based on the corrected feedback. In some embodiments, the first processing unit may include an RF energy supply component. In some such embodiments, replacing the RF energy supply component may include replacing the processing unit that includes the RF energy supply component. In some embodiments, the second processing unit may be separated from any RF energy supply component. Thus, the second processing unit may be replaced while all RF energy supply component are unchanged, and replacing any RF energy supply component may be carried out without replacing the second processing unit.

Figure 4B:
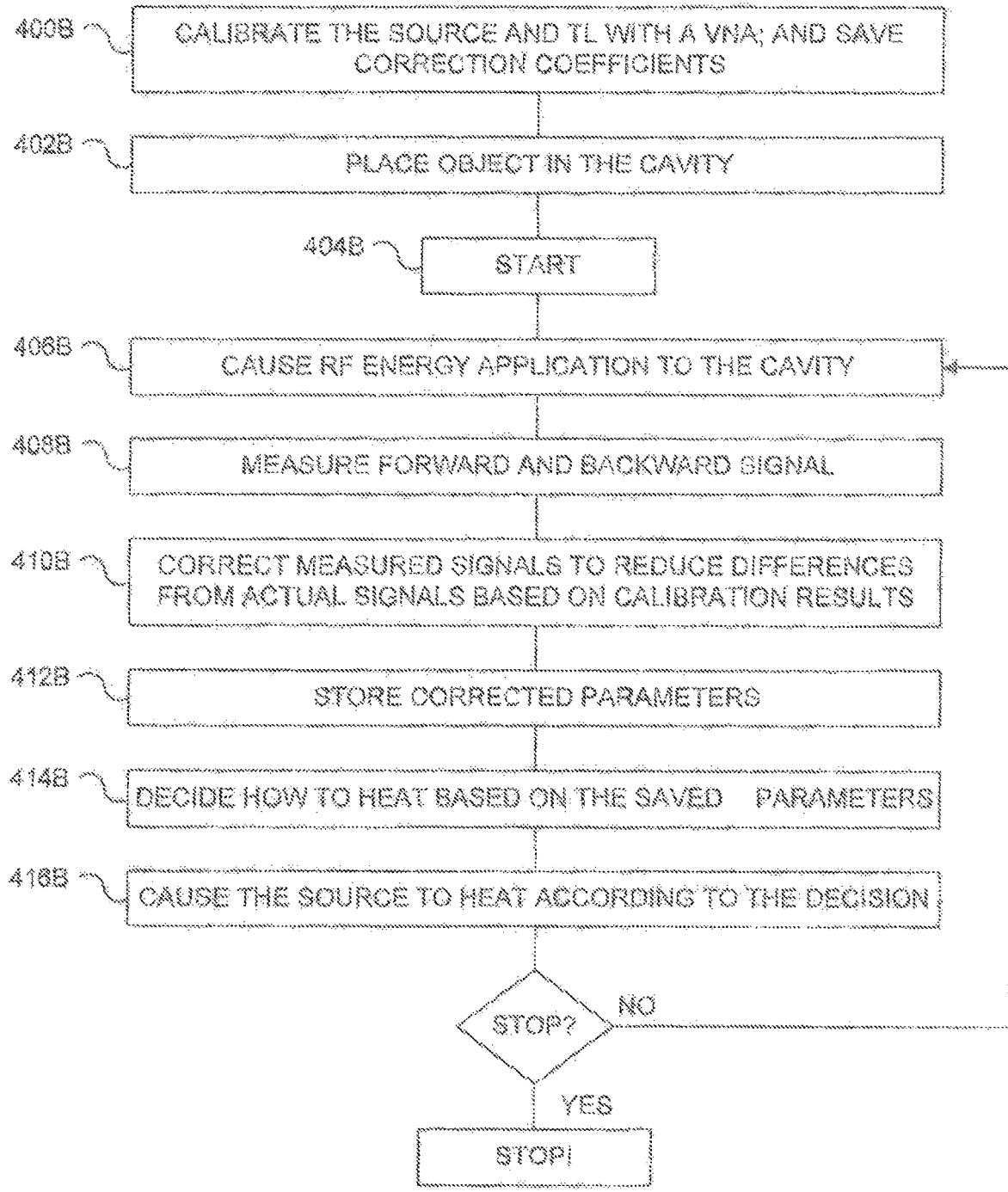
FIGS. 4B and 4C are flow charts of steps to be taken to heat an object based on corrected feedback according to some embodiments.

FIG. 4B is a flowchart of an exemplary method for obtaining corrected object characteristics, and using them for heating by apparatus 100. Step 400B includes calibrating source 112, e.g., using calibrated standards in the 3-error term, 8-error term, 12-error term, or any other method for calibrating a device using calibrated standards. In some embodiments, the standards may be open, short, and load. In some embodiments, where processing may take place at high power, the standards may be configured to stand the high power provided, e.g., by amplifier 116. In some cases, step 400B may make use of power level close to the lower end of the dynamic range of amplifier 116 (e.g., 50 W). For this purpose, standards that withstand high power may be provided, and calibrated against commercially available standards. In the present example, source 112 may be calibrated connected to the transmission lines (e.g., transmission line 117) leading from the source to the radiating element(s). Step 400B may further include saving the correction coefficients. Step 400B may be carried out, for example, as part of the manufacturing. This step may result in saving, e.g., in memory 155, error correction coefficients characterizing source 112. Memory 155 may further save a routine for calculating actual S parameters based on measured S parameters and the saved coefficients.

In step 402B an object to be heated (103) may be placed in cavity 102. This step and the following steps may be carried out at a user facility. For example, in embodiments where apparatus 100 is a domestic cooking oven, step 402B may be carried out in a household kitchen. Step 404B may include starting operation of apparatus 100, for example, by pushing a "start" button by the cook. As a result, processor 150 may start controlling source 112 to heat object 103. For example, in step 406B, processor 150 may cause application of RF energy at a predetermined frequency, e.g., 800 MHz. Source 112 supplies the RF energy for application to the radiating elements, which in return emit RP radiation to cavity 102. At the same time, backward RF signals return from the cavity to the radiating elements, and being measured (step 408B). Forward signals, coming from source 112 to cavity 102, may also be measured. The measurements may be taken, for example, by detector 118. Processor 150 may receive the feedback from detector 118 and initiate step 410B. Step 410B may include correcting the measured signals to reduce differences between them and the actual signals that would have been measured if measurement capabilities of apparatus 100 were closer to those of a benchmark measurement device. Step 410B may further include retrieving the error correction coefficients from memory 155, and running the routine saved in memory 155 to obtain the corrected S parameters of cavity 102 with object 103 therein at a predetermined frequency (e.g., frequency of 800 MHz). Processor 150 may then store these S parameters, e.g., in memory 155 (step 412B), and cause repetition of steps 406B to 412B, this time, at another frequency, for example, 800.5 MHz. Processor 150 may continue causing RF energy application at varying frequencies and storing the values of the corrected S parameters obtained at each frequency until a predetermined range of frequency is swept, for example, between 800 MHz and 1000 MHz. These operations may constitute a measurement stage, also referred to herein as a scanning stage. Then, in step 414B, processor 150 may decide, based on the corrected S parameters stored in step 412B, what energy application parameters to use during a processing stage. In step 416B processor 150 may cause source 112 supplying RF energy to cavity 102 in accordance with the decision taken in step 414B. Measurement cycles (steps 406B to 412B), decisions (414B) and heating cycles (416B) may be repeated, for example, until the cook pushes a "stop" button, which causes the processor to stop heating. In some embodiments, feedback is first measured (steps 406B and 408B) at each frequency and stored, and then, all the stored measured values are corrected.

Figure 4C:
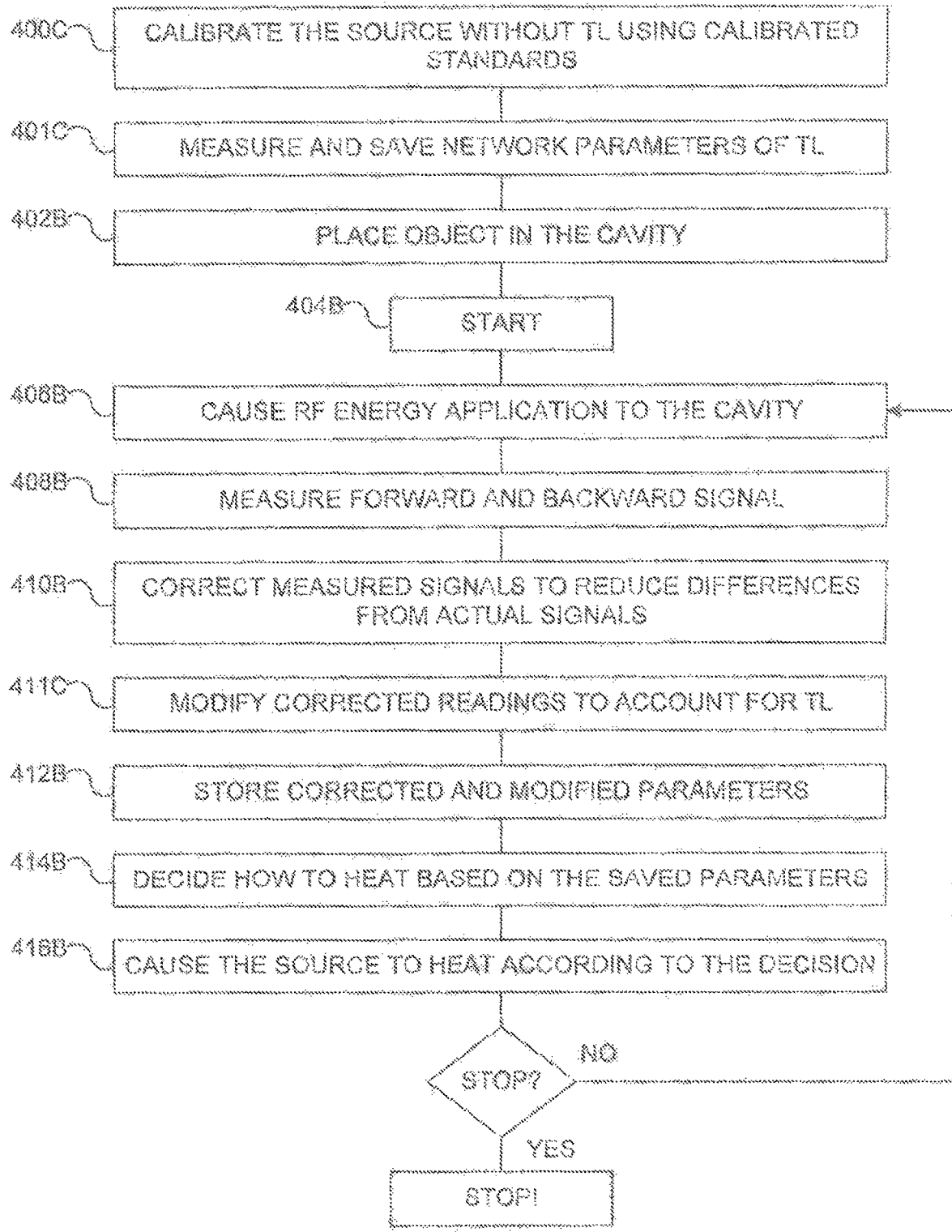

FIG. 4B describes an example for correcting the systematic errors associated with source 112 and transmission line 117. Thus, when a transmission line is replaced, for example, due to maintenance requirement, step 400B must be repeated, and the error correction coefficients should be measured for the entire apparatus again, using, e.g., the calibrated standards. The same is true if source 112 or any component thereof is replaced. Carrying out step 400B in the user's facility may be long and expensive, and therefore, in some embodiments, it may be omitted. FIG. 4C describes steps to be taken in order to obviate the need to repeat step 400B each time a component is replaced.

FIG. 4C is a flowchart of a method for replacing an RF energy supply component according to some embodiments of the invention. In this example, transmission line 117 is the component that may be replaced; however, a similar method can be applied to replace other components, for example, source 112. Step 400C, similar to step 400B, includes calibrating source 112, e.g., using calibrated standards. But in step 400C, source 112 may be calibrated disconnected from the transmission lines leading to the radiating element(s). Step 400C may result in storing, e.g., in memory 155, error correction coefficients characterizing source 112 without the transmission lines. Memory 155 may further store a routine for calculating actual S parameters based on measured S parameters and the stored coefficients.

In step 401C, the network parameters of the transmission lines are measured, e.g., using a vector network analyzer, and saved, e.g., in memory 155. Step 401C, as well as step 400C may be done during manufacturing of apparatus 100. Step 401C may be done separately for every transmission line produced, whether installed in an apparatus, or kept as a replacement component. The network parameters of components kept for replacement may be saved in a separate memory, and an identifier that enables retrieving them from the separate memory (e.g., a barcode, an RFID tag, a label carrying an ID code, etc.) may be associated with them. All the other steps described in FIG. 4C are the same as those described in FIG. 4B, except for step 411C.

Step 411C may include modifying the corrected data obtained in step 410B to account for the influence of the transmission line on the feedback. Step 411C includes retrieving the network parameters of the transmission line from memory 155, and using a method 400D (discussed in detail in relation to FIG. 4D) to obtain the S parameters of the cavity with the object therein that account for the influence of the transmission line on the measured feedback.

Method 400D may be used to obtain the S parameters of the cavity alone based on S parameters measured for the cavity and transmission line together using the de-embedding method. For this end, method 400D may use two sets of input values:

(1) network parameters of transmission line 117; and
(2) S parameters obtained in step 408B or 410B.

While S parameters are easy to measure, there is another set of network parameters, the T parameters, that lends itself to some mathematical manipulations that may prove useful for accomplishing the purpose of method 400D. Therefore, the measured network parameters may be transformed to the T parameters. There is a well known relation between S parameters and T parameters, which may be summarized in the following matrix notation:

$$\begin{bmatrix} T_{11} & T_{12} \\ T_{21} & T_{22} \end{bmatrix} = \begin{bmatrix} -\dfrac{S_{11}S_{22} - S_{21}S_{12}}{S_{21}} & \dfrac{S_{11}}{S_{21}} \\ -\dfrac{S_{22}}{S_{21}} & \dfrac{1}{S_{21}} \end{bmatrix}$$

Figure 4D:
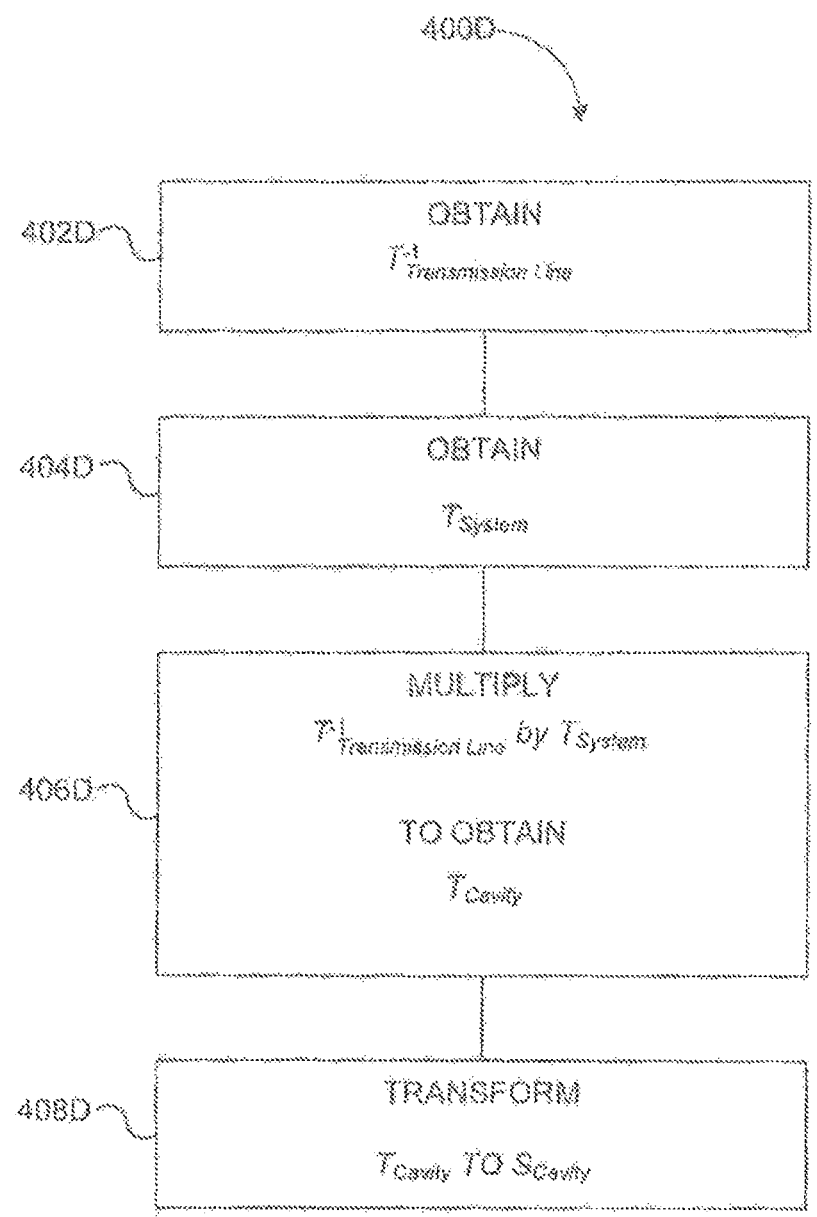
FIG. 4D is a flow chart for a routine for obtaining S parameters of a cavity according to an exemplary embodiment.

FIG. 4D is a flowchart showing how method 400D may be carried out according to some embodiments. Method 400D may include step 402D, of obtaining the inverse of the T matrix of the transmission line. The network parameters of the transmission line may be provided "as measured" (e.g., as an S matrix) or "ready for use" (e.g., as the inverse of the T matrix, $T^1$). Since the S parameters are easily measured, in some embodiments step 402D may include: receiving the S matrix of the transmission line, transferring it to the equivalent T matrix, e.g., as described in the above matrix notation, and inverting the obtained T matrix to obtain the $T^1$ matrix. In some embodiments, however, the method uses the inverted T matrix as input, for example, if $T^1$ is calculated in the factory and associated with the transmission line. In such embodiment, step 402B may include merely reading the inverted T matrix from a memory.

In step 404D, the T matrix of the cavity-transmission line system is obtained. This may be carried out by first receiving measured S parameters, and then transforming them to T parameters. In difference from the transmission line, which stays the same regardless of the object being heated in the cavity, the electrical response of the cavity (and with it the S parameters of the cavity-transmission line system) changes when the object changes. For example, heating different objects in the cavity, having in the cavity a given object in different locations or at different temperatures may all result in different S parameters. Therefore, the T parameters of the system should be calculated repeatedly from measured data, while the T parameters of the transmission line may be calculated once in the factory. In some embodiments, the S parameters of the system, transformed to T parameters in step 404D, are corrected S parameters. In other embodiments, the S parameters transformed in step 404D are the measured parameters. The error correction, if required, may take place after the S parameters are transformed, for example, after $S_{cavity}$ is obtained in step 408D, described below. Thus, in step 404D the measured (or corrected) S parameters of the system constituted by the cavity and the transmission line may be transformed into a T matrix ($T_{system}$).

In Step 406D, the $T^1_{transmission\ line}$ (obtained in step 402D) may be multiplied by $T_{system}$ (obtained in step 404D) to obtain the T parameters of the cavity alone, $T_{cavity}$, since $$T_{system} = T_{cavity} T_{transmission\ line} \text{ and}$$

$$T_{system} T^1_{transmission\ line} = T_{cavity}$$
$$T_{transmission\ line} T^1_{transmission\ line} = T_{cavity}$$

In step 408D, matrix $T_{cavity}$ may be transformed to $S_{cavity}$ according to the following relation:

$$\begin{bmatrix} s_{11} & s_{12} \\ s_{21} & s_{22} \end{bmatrix} = \begin{bmatrix} \dfrac{T_{12}}{T_{22}} & \dfrac{T_{11}T_{22} - T_{12}T_{21}}{T_{22}} \\ \dfrac{1}{T_{22}} & -\dfrac{T_{21}}{T_{22}} \end{bmatrix}$$

Method 400D described above performs a de-embedding operation. Such a de-embedding operation may further refine the S parameters and object characteristics determined based on the measured feedback.

The corrected S-parameters may enable computation of a corrected electrical characteristic of the object that more closely represents the actual electrical characteristic of the object. Use of this information can enable determination of more appropriate RF energy application parameters based on the feedback and, in turn, may result in more effective, efficient, reproducible, and/or accurate processing of the object using applied RF energy.

Figure 5A:
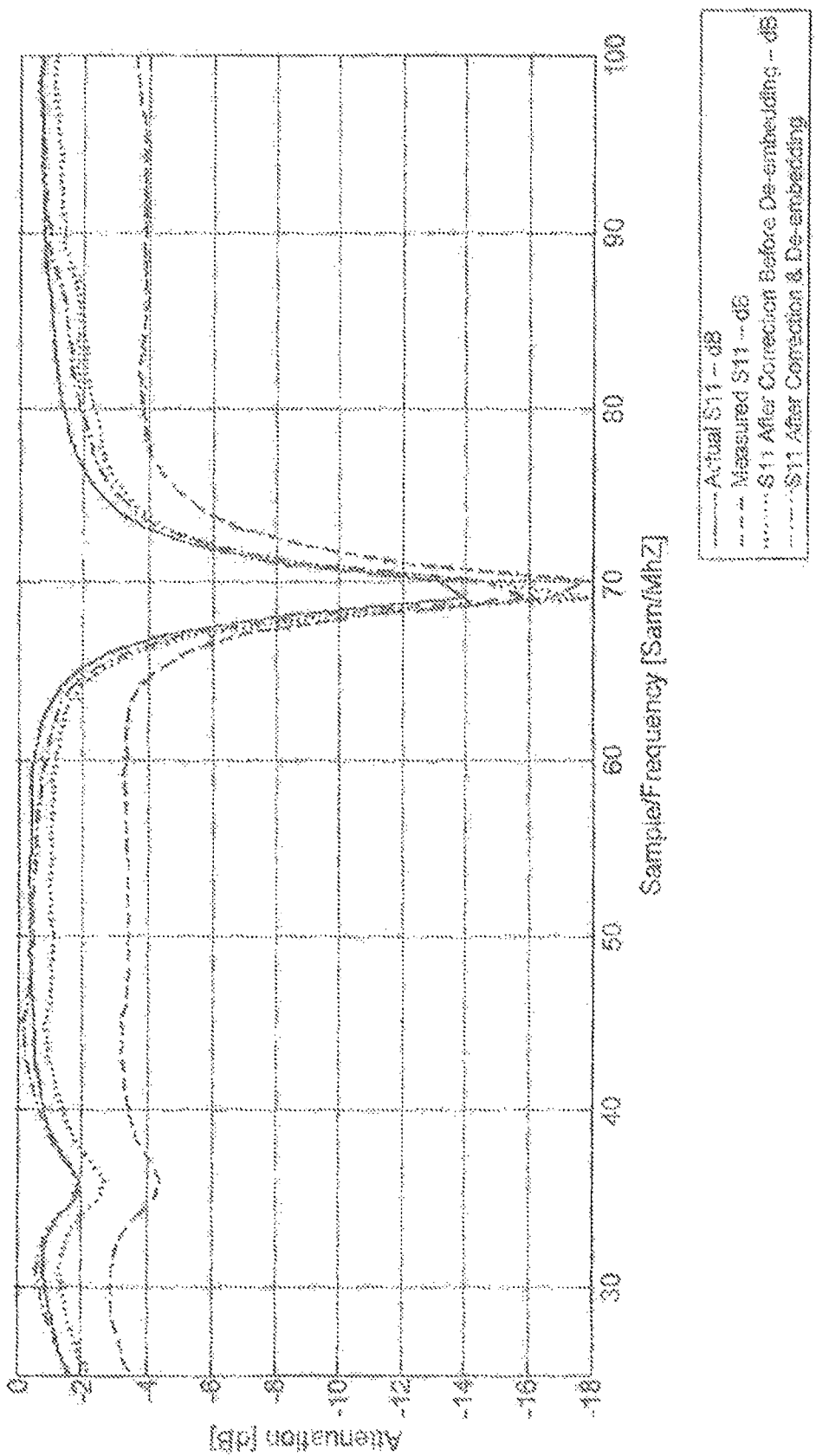
FIG. 5A is an exemplary graph that presents measured, actual, and corrected magnitudes of S parameters obtained according to exemplary disclosed embodiments.

FIG. 5A is an exemplary graph of various data relevant to or associated with the operation of apparatus 100. The data shown in FIG. 5A illustrate potential advantages of certain embodiments of the present disclosure that may be realized by accounting for the electrical responses of the RF energy supply components of apparatus 100. FIG. 5A presents actual data, measured data, corrected data, and corrected and de-embedded data. On the graph, the y-axis represents attenuation in dB, and the x-axis represents frequency in MHz, shifted by 800 MHz, i.e., X=50 corresponds to f=850 MHz, etc.

Additional graph 5B includes plots of the phase (in degrees) of S11 versus frequency. Both FIGS. 5A and 5B show actual data, as measured by a VNA—in solid line; measured data—in dashed line; data after error correction and before de-embedding—in dotted line; and data after error correction and de-embedding—in dot-dashed line.

Figure 5B:
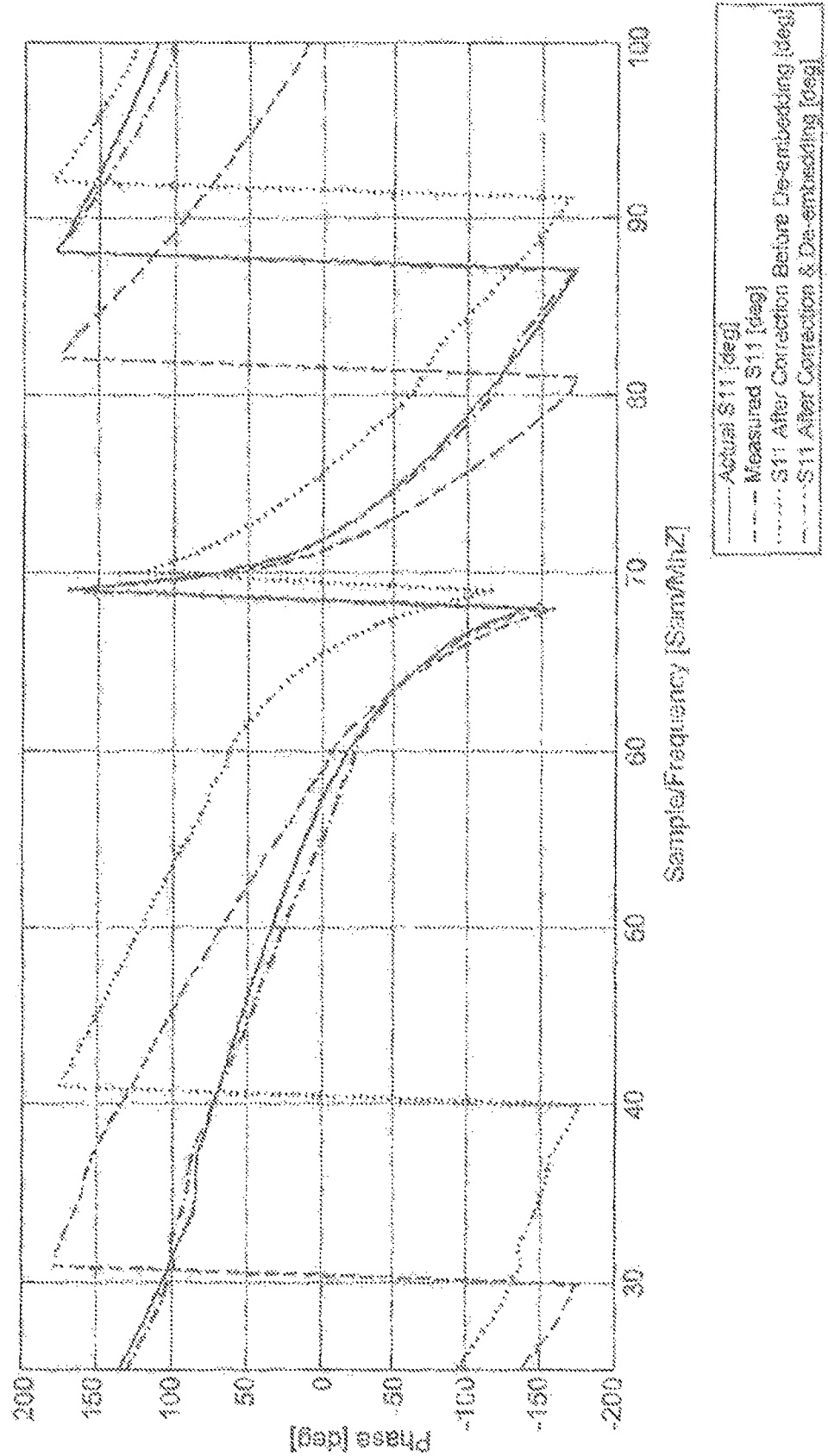
FIG. 5B is an exemplary graph that presents measured, actual, and corrected phases of S parameters obtained according to exemplary disclosed embodiments.

As shown in FIGS. 5A and 5B, the corrected S-parameters calculated based on the feedback and the stored coefficients (and also based on the additional de-embedding process) are closer to the S-parameters determined from direct measurements in the cavity compared to those S-parameters determined based on feedback alone. For example, in FIG. 4B at 880 MHz (x=80) the actual magnitude of the S11 parameter has the highest value and the measured S11 has the lowest value, and the corrected value is higher than the measured value and the corrected and de-embedded value is even higher, although still below the actual value. In FIG. 5B at the same frequency, the actual and the final value (obtained by correcting and de-embedding) are almost the same, while the measured value is much lower, and the corrected value is much higher.

In some embodiments, processor 150 may receive feedback values from detector 118, and correct the received values using calibration coefficients associated with source 112. The calibration coefficients may be stored in memory 155. Processor 150 may then control source 112 based on the corrected values. In some embodiments, the processor may further correct (modify) the corrected feedback values to account for systematic errors that may originate in RP energy supply components other than source 112, for example, transmission line 117. Modifying the corrected feedback values to account for systematic errors based on network parameters of the energy supply component also known as de-embedding the feedback values. In some embodiments, the feedback is used by processor 155 as input for taking control decisions in controlling source 112 only after de-embedding.

In some cases, replacement of one or more RF energy supply components of apparatus 100 may be required. Such replacement may be required due to malfunction, as part of a component upgrade, as part of ordinary scheduled maintenance, or for any other reason. Any or all of the RF energy supply components of apparatus 100 may be replaced, including, for example, power supply 113, modulator 115, amplifier 116, transmission lines 117, splitters, couplers, signal generators etc. Additionally, or alternatively, processor 150 and/or memory 155 may be replaced. The replacement of any of these component may take place at the manufacturer site or at a repair facility, for example, when the apparatus is sent back for repair. Alternatively, the replacement may be performed by a field technician, dealer, or user, for example, at location where apparatus 100 may be installed.

In some instances, the electrical characteristics of the replacement component and, therefore, the coefficients that represent those characteristics may not match the electrical response/coefficients of the component being replaced. Such a difference may lead to the introduction of inaccuracies into the determination of corrected characteristics of objects being processed. Therefore, apparatus 100 may be configured to determine (e.g., by retrieval from a database) a set of coefficients for the replacement component(s) and update memory 155 with the coefficients for the replacement component(s). In some embodiments, processor 150 and memory 155 may be replaced. In those embodiments, apparatus 100 may be equipped with backup storage where a copy of the coefficients may be maintained. Alternatively, a data transfer facility may be made available to transfer stored coefficients from memory 155 to the memory of the replacement processor.

Coefficients associated with the electrical behavior of replacement components (for example, network parameters of the replacement component) are referred to herein as update coefficients. Update coefficients may be obtained in a variety of ways. In some embodiments, the update coefficients may be retrieved based on an identifier associated with the replacement component. Such an identifier may include any element or marking that may be used to retrieve a set of coefficients associated with the RF energy supply component. For example, the identifier may include a number, serial number, alphanumeric sequence, etc. The identifier may be provided or printed directly on the replacement component, encoded in a bar code, stored in an RFID tag, stored in an electronic memory device etc. on, included with, or otherwise associated with the replacement component.

The identifier may be used to retrieve update coefficients from a memory remotely located with respect to apparatus 100, from within memory 155, or from any other location. For example, the identifier may be unique to a specific replacement component and may be stored in a memory along with a set of coefficients representing the electrical characteristics of the replacement component. Determination of the unique identifier for a replacement component, for example, as part of the replacement procedure for the component can enable retrieval of the set of update coefficients for the replacement component. Memory 155 may be updated to include the update coefficients retrieved using the identifier.

The retrieval of the set of update coefficients based on the identifier may be done automatically. For example, a reading device (e.g., bar code scanner. RFID tag reader, etc.) may be used to determine an identifier associated with a replacement component. The reading device may be associated with apparatus 100 or may include a unit separate from apparatus 100. Once the reading device has obtained the identifier, the identifier may be used to retrieve the update coefficients for the replacement component. For example, processor 150, or any other computing device either associated with apparatus 100 or separate from apparatus 100, may automatically retrieve the update coefficients based on the obtained identifier. In some embodiments, processor 150 may retrieve the update coefficients from onboard memory 155. In other embodiments, processor 150 may initiate communication with another computing system (e.g., a server, host computer system, etc.) over a computer network (e.g., a LAN. WAN. Internet, in a wired or wireless manner) through interface 160 and, using the obtained identifiers, may download the update coefficients for one or more replacement coefficients. Once the update coefficients for the replacement components have been obtained, those update coefficients may be stored in memory 155 or in any other location or device accessible by processor 150.

The upload of the set of update coefficients based on the identifier may also be initiated by a field technician or other service agent. For example, as part of the procedure for replacing an RF energy supply component, the service agent may locate an identifier associated with a replacement component (e.g., read the identifier from a machine readable element or memory, type a serial number into a computing unit, etc.) and use the identifier to retrieve update coefficients for the replacement coefficient. For example, in some embodiments, the service agent may use a laptop computer, a notepad computer, smartphone, processor 150, etc. to access a remote repository and download update coefficients for one or more replacement components based on identifiers that the service agent obtains for the replacement components.

In some embodiments, sets of update coefficients for one or more replacement RF energy supply components may be obtained without using identifiers. For example, update coefficients may be read or acquired directly from an electronic memory device. In some embodiments, a replacement component may be paired with a memory device such as a disk on key, SD card, or RFID tag in which the electrical response coefficients (e.g., network parameters) for that component are stored. In such embodiments, these coefficients may be read from or otherwise transferred to apparatus 100 (e.g., transferred into memory 155) from the memory device or RFID tag associated with the replacement component. Additionally or alternatively, electrical response coefficients for the replacement coefficient may be encoded in a machine-readable element, including an image, bar code, etc. associated with the replacement component. These machine-readable elements may be placed directly on the replacement component, associated with packaging for the replacement component, etc. In these embodiments, the coefficients for the replacement component may be read from the machine-readable element associated with the replacement component.

In addition or in the alternative, processor 150 may be configured to autonomously determine a set of update coefficients for a replacement RF energy supply component. For example, the update coefficients may be based on an observed difference between an operational characteristic of the apparatus before and after installation of the replacement RF energy supply component.

In one such example, prior to replacement of an RF energy supply component, processor 150 may establish and store baseline feedback for a known set of operation conditions. For example, processor 150 may cause supply of RF energy for application to the radiating elements to emit RF radiation to an empty cavity 102 at known excitation setups, observe the feedback obtained, and save the feedback. This measured feedback may serve as a baseline to which other feedback measurements may be compared. In another example, corrected S parameters may be calculated for the empty cavity 102 based on the baseline feedback and the set of coefficients associated with the RF energy supply component. This set of corrected S parameters from the measured feedback may serve as a baseline to which other corrected S parameters may be compared.

After replacement of an RF energy supply component, processor 150 may determine a set of update coefficients for the replacement component based on newly measured feedback at the known set of operating conditions (e.g., at the known excitation setups), the baseline stored information for the known set of operating conditions (e.g., the baseline feedback or the corrected S parameters of the empty cavity at the known excitation setups), and the original coefficients for the replaced component. For example, if under the known set of operating conditions, a difference is present between the newly observed and baseline feedback or between newly calculated S parameters and the baseline S parameters, processor 150 may attribute this difference to differences between the electrical response characteristics of the replacement component and those of the replaced component. To determine the set of update coefficients, in general, processor 150 may methodically modify the coefficients associated with the replaced component until the measured feedback matches the stored baseline feedback values or until a newly calculated set of S parameters matches the baseline S parameters. It is noted that while in the above example processor 150 may start the methodical modification from the original set of coefficients associated with the replaced component, any set of coefficients may serve as a starting point to the methodical modification process.

Figure 6:
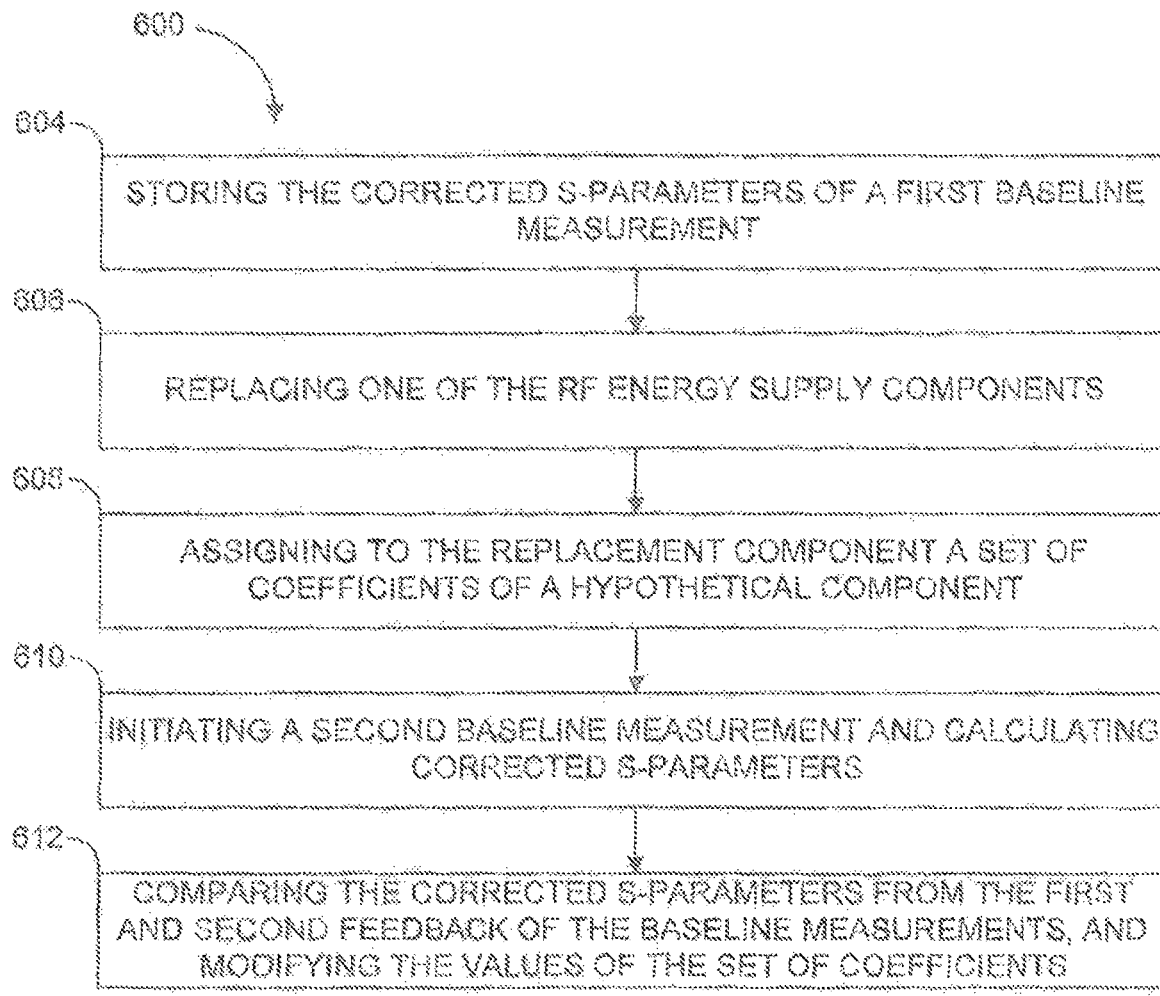
FIG. 6 is a flow chart of an exemplary method for determining a set of network parameters of a replacement component according to exemplary disclosed embodiments.

FIG. 6 provides a flowchart 600 of an exemplary method for autonomously determining a set of update coefficients for a replacement component In step 604, corrected S-parameters of the cavity (e.g., when the cavity is empty) may be determined based on feedback measured at a known set of conditions (e.g., a given plurality of frequencies) and based on electrical response coefficients of one or more RF energy supply components, for example, in a manner similar to the process described above with respect to steps 402-406 in FIG. 4A.

The RF energy supply component may be, for example, a transmission line, in which case the electrical response coefficients may include network parameters of the transmission line. In another example, the energy supply component may be an RF source, and the electrical response coefficients may include error correction coefficients. The corrected S-parameters may be stored as a baseline, referred to herein as the first baseline.

In step 606, at least one of the RF energy supply components may be replaced. In step 608, the replacement component may be assigned with a set of coefficients of a hypothetical component. In some embodiments, as a starting point, the set of coefficients assigned to the replacement component may be the set of coefficients associated with the component that was replaced. In step 610, feedback is again observed under the same conditions in which the baseline S parameters were determined (e.g., the same plurality of frequencies, measured when the cavity is empty). Based on this feedback and the set of coefficients assigned to the replacement component (and, in some cases, also based on electrical response coefficients of other energy supply components), a new set of corrected S parameters may be determined for the cavity. This new set of corrected S parameters is referred to herein as the second baseline. At step 612 the second baseline may be compared to the first baseline. If a difference between the first and second baselines exceeds a predetermined threshold, the set of coefficients assigned to the replacement coefficient may be changed a little and another set of S-parameters may be determined based on the feedback and the slightly changed set of coefficients, obtaining another second baseline. This process may continue iteratively until it produces a set of coefficients that results in a second baseline that substantially matches the first baseline. This set of coefficients may be used as update coefficients. Once obtained, this autonomously determined set of update coefficients may be stored for later use by processor 150.

The process for determining a set of update coefficients for a replacement component may be initiated in any suitable manner. For example, in some embodiments, a service technician may initiate the process as a step in the replacement process. In other embodiments, the process for determining a set of update coefficients may be initiated automatically, for example, upon connecting a new RF energy supply component in apparatus 100, after a new RF energy supply component is detected (e.g., via a new identifier associated with a machine-readable element, RFID tag, memory, etc.), as part of maintenance routine, or through any other trigger.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

In the above description and the following claims, expressions of the format "one or more of A and B" is used to convey that A, B, or both may exist. Expressions of such format cover each and every one of the following possibilities: (i) one or more A's with no B's; (ii) one or more B's with no A's; (iii) one or more A's and one or more B's.

What is claimed:

1. A method of processing an object in an energy application zone by radio frequency (RF) radiation emitted by one or more radiating elements configured to emit the RF radiation in response to RF energy applied thereto, the method comprising:
    controlling supply of RF energy to the one or more radiating elements via an RF energy supply component;
    receiving measured response values produced based on RF energy received by the one or more radiating elements from the energy application zone;
    accessing a stored set of coefficients associated with the RF energy supply component, said set of coefficients being utilized to transform the measured response values; and
    controlling application of RF energy to the one or more radiating elements based on the measured response values and the set of coefficients.

2. The method of claim 1, wherein the set of coefficients associated with the RF energy supply component includes values of network parameters of the RF energy supply component.

3. The method of claim 1, wherein the set of coefficients associated with the RF energy supply component includes error correction coefficients configured to correct systematic errors in the functioning of the RF energy supply component.

4. The method of claim 1, wherein one or more coefficients from the set of coefficients are indicative of an electrical response of the RF energy supply component to an electrical signal.

5. The method of claim 1, wherein the RF energy supply component includes a dual directional coupler having directivity below 30 dB.

6. The method of claim 1, further comprising correcting the received measured response values based on the set of coefficients; and wherein the controlling the application of the RF energy is based on the corrected measured response values.

7. The method of claim 1, wherein the RF energy supply component includes an RF energy source.

8. The method of claim 1 wherein the RF energy supply component includes an RF energy transmission line.

9. The method of claim 1, wherein the at least one RF energy supply component comprises at least two RF energy supply components and wherein accessing a stored set of coefficients associated with the RF energy supply component comprises accessing at least two sets of coefficients, each set of coefficients being associated with a respective RF energy supply component.

10. The method of claim 1, wherein receiving the measured response values comprises receiving during a scanning stage and wherein controlling application of RF energy to the one or more radiating elements is based on the measured response values received during the scanning stage.

11. The method of claim 1, wherein receiving the measured response values comprises receiving during a scanning stage, within which RF radiation is emitted from the one or more radiating elements for determining one or more absorption characteristics of the object without substantially processing the object.

12. The method of claim 1, wherein the received measured response values includes a respective value for each of a plurality of frequencies of RF radiation emitted from the one or more radiating elements.

13. The method of claim 1, wherein the received measured response values includes information associated with each of the one or more radiating elements.

14. The method of claim 1, wherein the received measured response values includes one or more network parameter values depending on a response of the energy application zone to the emission of the RF radiation.

15. The method of claim 1, further comprising determining a corrected electrical characteristic of the object based on the received measured response values and the accessed set of coefficients.

16. The method of claim 1, wherein the set of coefficients comprises at least one coefficient per frequency of the emitted RF radiation.

17. The method of claim 1, wherein one or more coefficients of the set of coefficients are indicative of network parameter values of the RF energy supply component that can be determined using a network analyzer.

18. The method of claim 17, wherein the network parameter values are indicative of a ratio between a reflected signal voltage and an incident signal voltage in the RF energy supply component.

19. The method of claim 17, wherein the network parameter values are indicative of a ratio between a transmitted signal voltage and an incident signal voltage in the RF energy supply component.

20. A method of processing an object in an energy application zone by radio frequency (RF) radiation emitted by one or more radiating elements configured to emit the RF radiation in response to RF energy supplied thereto, the method comprising:
    controlling, via an RF energy supply component, a supply of RF energy to the one or more radiating elements;
    receiving measured response values based on RF energy received from one or more radiating elements;
    accessing a set of coefficients associated with the RF energy supply component, said set of coefficients being utilized to transform the measured response values; and
    controlling application of RF energy to the energy application zone by the one or more radiating elements based on the accessing.

21. A method of processing an object in an energy application zone by radio frequency (RF) radiation emitted by one or more radiating elements configured to emit the RF radiation in response to RF energy supplied thereto, the method comprising:
    controlling, via an RF energy supply component, RF energy supply to the one or more radiating elements;
    receiving, via a measurement arrangement, measured response values produced during the controlling;
    accessing, via a memory, a stored set of coefficients associated with the RF energy supply component, said set of coefficients being utilized to transform the measured response values;
    controlling, via a processor, application of RF energy to the one or more radiating elements based on the accessed set of coefficients.

22. The method of claim 21, wherein the controlling is further based on the received measured response values.

* * * * *